US008019198B2

(12) United States Patent
Shimazaki et al.

(10) Patent No.: US 8,019,198 B2
(45) Date of Patent: Sep. 13, 2011

(54) RECORDING AND REPRODUCING APPARATUS

(75) Inventors: Hiroaki Shimazaki, Osaka (JP); Katsuo Saigo, Hyogo (JP); Hideyuki Ohgose, Osaka (JP); Kenjiro Tsuda, Osaka (JP)

(73) Assignee: Panasonic Corporation, Osaka (JP)

( * ) Notice: Subject to any disclaimer, the term of this patent is extended or adjusted under 35 U.S.C. 154(b) by 1198 days.

(21) Appl. No.: 11/664,414

(22) PCT Filed: Nov. 8, 2005

(86) PCT No.: PCT/JP2005/020773
§ 371 (c)(1),
(2), (4) Date: Apr. 2, 2007

(87) PCT Pub. No.: WO2006/059475
PCT Pub. Date: Jun. 8, 2006

(65) Prior Publication Data
US 2008/0279532 A1    Nov. 13, 2008

(30) Foreign Application Priority Data
Nov. 30, 2004   (JP) ................................. 2004-347541

(51) Int. Cl.
*H04N 9/80* (2006.01)
(52) U.S. Cl. ....................................... 386/252; 386/253
(58) Field of Classification Search .................. 386/252, 386/253, 254, 257, 263
See application file for complete search history.

(56) References Cited

U.S. PATENT DOCUMENTS
6,938,162 B1    8/2005  Nagai et al.
2002/0126843 A1  9/2002  Murase et al.
2005/0086505 A1  4/2005  Ishibashi et al.
2005/0185547 A1  8/2005  Nagai et al.
2006/0110137 A1* 5/2006  Tsuda et al. ................... 386/123
(Continued)

FOREIGN PATENT DOCUMENTS
EP         1 045 388 A1     10/2000
(Continued)

OTHER PUBLICATIONS

Marc J. Rochkind, "The Source Code Control System", Proceedings of the National Conference on Software Engineering, Sep. 11, 1975, pp. 37-43, XP008016123.
"5.5 Content Storage", Technical data for operating procedures of digital terrestrial television, 8th Part (procedures for protecting contents in digital terrestrial television), FP05054IDS.
(Continued)

*Primary Examiner* — Robert Chevalier
(74) *Attorney, Agent, or Firm* — McDermott Will & Emery LLP

(57) ABSTRACT

To provide a recording and reproducing apparatus that recovers contents having approximately the same quality as the original contents in a short time and requiring only light processing load, at the time of (a) moving the contents from the first recording medium to the second recording medium, (b) rewriting the contents in order to disable reproduction of the contents, (c) reconstructing the original contents by recovering the contents from the second recording medium to the first recording medium. The recording and reproducing apparatus includes a move processing unit 72*a* and a recovery processing unit 73*a*. The former records reconstruction information on the second recording medium in association with the second contents, the reconstruction information being used in reconstructing one or more parts of the contents that have been rewritten in order to disable reproduction of the contents at the time of moving the contents. Also, the latter reconstructs the original contents based on the remaining contents recorded on the first recording medium by recovering the reconstruction information from the second recording medium and using the reconstruction information.

4 Claims, 24 Drawing Sheets

U.S. PATENT DOCUMENTS

2008/0310292 A1 12/2008 Nagai et al.

FOREIGN PATENT DOCUMENTS

| EP | 1 233 414 A2 | 8/2002 |
| --- | --- | --- |
| JP | 2000-4256 | 1/2000 |
| JP | 2001-189015 | 7/2001 |
| JP | 2002-244926 | 8/2002 |
| JP | 2002-334559 | 11/2002 |

OTHER PUBLICATIONS

International Preliminary Report on Patentability and Written Opinion of the International Searching Authority, issued in corresponding International Patent Application No. PCT/JP2005/020773, mailed on Apr. 4, 2007.

Japanese Office Action issued in Japanese Patent Application No. 2007-524108, mailed Mar. 15, 2011.

* cited by examiner

FIG. 22
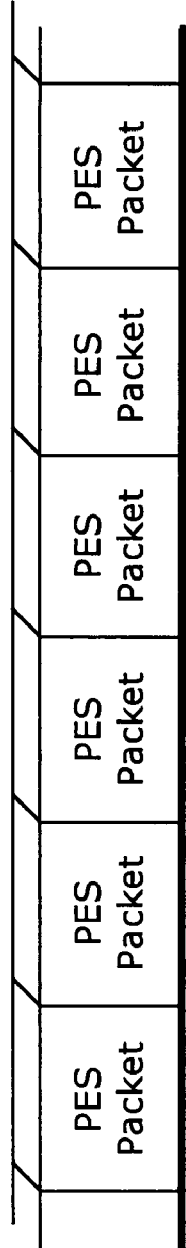
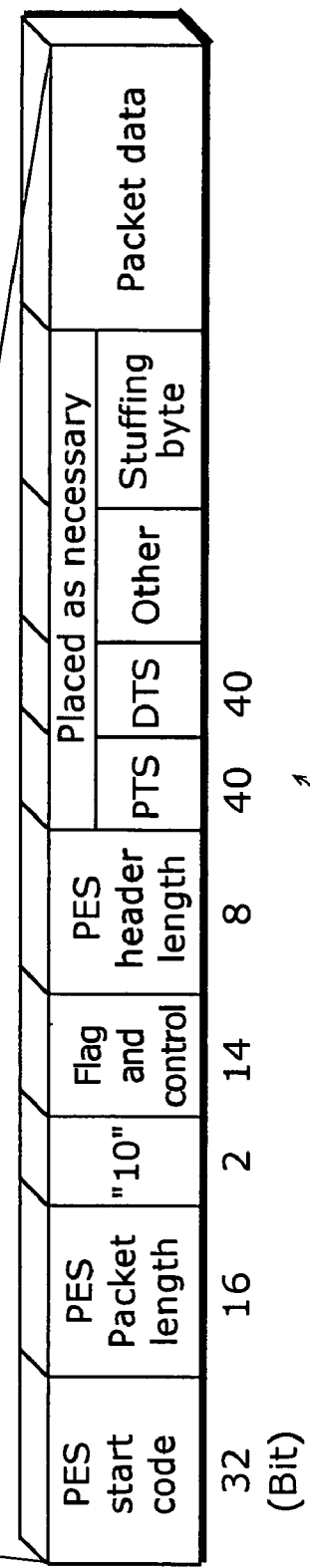

RECORDING AND REPRODUCING APPARATUS

RELATED APPLICATIONS

This application is the U.S. National Phase under 35 U.S.C. §371 of International Application No. PCT/JP2005/020773, filed on Nov. 8, 2005, which in turn claims the benefit of Japanese Application No. 2004-347541, filed on Nov. 30, 2004, the disclosures of which Applications are incorporated by reference herein.

TECHNICAL FIELD

The present invention relates to a recording and reproducing apparatus that records and reproduces contents such as sound and video, especially to a recording and reproducing apparatus that can securely move, to another recording medium, contents protected by copyright.

BACKGROUND ART

Digital television broadcasting including high-definition television (called HDTV hereafter) has recently enabled providing high-quality sound and video contents that can compare favorably with the originals (such contents are called simply contents hereafter). Further, digital video recorders that have the following features have already become commercial: receiving contents that have been broadcast in digital television broadcasting; and recording the received contents on a hard disc, a rewritable optical disc or the like.

Accompanied by this, protecting the copyright of video contents is increasingly becoming important. For example, in a satellite digital broadcasting and digital terrestrial television broadcasting, a system called "copy-once control" has been implemented in Japan in 2004.

The system of the copy-once control will be described below. First, control signals indicating "capable of being recorded only once" (called copy-once control signals hereafter) are added to sound and video data, and then the resulting data are encrypted. Further, the obtained encrypted digital data are broadcast. At this time, such digital data that are received in broadcasting are allowed to be digitally decoded only once. In other words, the sound and video data to which copy-once control signals are added can be recorded on a recording medium such as a hard disc and a rewritable optical disc. Such copy-once control signals are rewritten as copy-never control signals at the time of recording. Therefore, the resulting signals disable copying the recorded data on another recording medium. However, there is an exception as will be described below. It is allowed to move the recorded data to another recording medium on the premise of deleting or disabling reproduction of the recorded data held on an original recording medium. (For example, refer to the following Reference Document 1.)

Reference Document 1: the eighth part (procedures for protecting contents in digital terrestrial television) Technical data for operating procedures of digital terrestrial television using the one or more pieces of important information for reproduction included in the read reconstruction information represented by ARIB TR-B14. ARIB is an abbreviation for "Association of Radio Industries and Businesses, and ARIB TR-B14 is a technical document distributed by the ARIB.

Here is an example case of receiving contents protected by copyright via digital television broadcasting and directly record the contents on a first recording medium such as a rewritable optical disc using the above-mentioned conventional technique. In this case, the reproduction of the contents is disabled on the first recording medium but the contents are not rewritten. Such contents cannot be recorded by a recording and reproducing apparatus, but they may be read out by using a drive of a personal computer. In other words, there is a fear that such contents are illicitly copied. Here is another example case of rewriting the contents on the first recording medium in order to disable reproduction at the time of moving the contents from the first recording medium to a second recording medium. In this case, the contents must be written back from the second recording medium at the time of the recovery of the contents on the first recording medium, which causes problems that it takes very long time and that the processing load increases.

Also, a conventional recording and reproducing apparatus that can perform a copy-once control moves contents to an external recording medium such as an optical disc. Therefore, in the case of moving the contents to a recording medium whose capacity is limited, compression coding may be performed on the sound and video data again in order to decrease the data rate, and then such sound and video data may be moved on it. In the case of moving contents in a decreased data rate and once rewriting the data of the contents in order to disable reproduction causes a problem that the original reproduction quality of the contents cannot be recovered any more.

DISCLOSURE OF INVENTION

Therefore, the present invention is conceived considering the above-mentioned problems. An object of the present invention is to provide a recording and reproducing apparatus that can rewrite the contents on a first recording medium in order to disable reproduction of the contents at the time of moving the contents from the first recording medium to a second recording medium, and that can recover the data of the contents to be reproduced in the quality which is approximately the same as the original quality in a short time and requiring only a light processing load at the time of moving the data from the second recording medium to the first recording medium.

In order to achieve the above-mentioned object, the recording and reproducing apparatus in the present invention generates a second content based on a first content recorded on a first recording medium, and records the generated second content on the second recording medium, including: a moving unit that records reconstruction information on the second recording medium in association with the second content, the reconstruction information being used in reconstructing one or more parts of a content that remains on the first recording medium at the time of recording the second content including the reconstruction information, and the remaining content being generated when the one or more parts of the first content are rewritten in order to disable reproduction of the first content; and a recovery unit that reads out the reconstruction information recorded on the second recording medium and reconstructs the original content using the reconstruction information at the time of recovering the original content based on the remaining content recorded on the first recording medium.

The recovery unit enabling reading the reconstruction information that is recorded in association with the contents on the copy-destination recording medium at the time of recovering the original contents based on the remaining contents that are recorded on the original recording medium, and recovering the parts that have been rewritten in order to disable reproduction using the read reconstruction information.

In this way, the original contents are recovered without writing back the whole contents on the copy-destination recording medium. Therefore, with the recovery unit, it becomes possible to recover the original contents securely protecting the copyright of the contents, in a short time and without increasing the processing load.

Note that the present invention may be realized not only as a recording and reproducing apparatus but also as (a) a method for controlling the recording and reproducing apparatus (called recording and reproducing control method hereafter), (b) a recording and reproducing control program that causing a computer or the like to execute the recording and reproducing control method, (c) a recording medium on which the recording and reproducing control program is recorded or the like.

Also, it may be realized as a recording medium recording the contents generated by the recording and reproducing apparatus.

Further, it may be realized as a system LSI, embedded on a recording and reproducing apparatus, having a function for protecting contents protected by copyright (the function is called content protection function hereafter), and an IP core (called content protection core hereafter) that configures a programmable to logic device with a content protection function, such a device being, for example, an FPGA and a CPLD. Also, it may be realized as a recording medium on which the content protection core is recorded.

As described up to this point, with the recording and reproducing apparatus in the present invention makes it possible to rewrite the important information for reproduction included in the part of or the whole contents to be moved in order to disable reproduction at the time of moving the part of or the whole contents from the first recording media to the second recording media.

At this time, before rewriting the data of the contents in order to disable reproduction, the important information for reproduction is extracted from the data, reconstruction information is made from the extracted one or more pieces of important information for reproduction, and the made reconstruction information is recorded on the second recording medium in association with the contents on the copy-destination recording medium. Further, at the time of recovering the original contents based on the remaining contents that are recorded on the original recording medium, the reconstruction information that is recorded in association with the contents on the copy-destination recording medium is read out and then the contents are recovered by overwriting the irreproducible parts with the one or more pieces of important information for reproduction included in the read reconstruction information, instead of writing back the whole contents on the copy-destination recording medium.

In this way, it becomes possible to recover the original contents securely protecting the copyright, in a short time and without increasing the processing load.

Also, the reconstruction information can be made from a decryption key used at the time of decrypting the parts that have been encrypted and have been rewritten in order to disable reproduction, and the made reconstruction information is recorded on the copy-destination recording medium in association with the contents on the copy-destination recording medium. Further, at the time of recovering the original contents based on the remaining contents that are recorded on the original recording medium, the original contents are recovered by reading out the reconstruction information that is recorded in association with the contents on the copy-destination recording medium and by decrypting the parts that have been rewritten in order to disable reproduction, using a decryption key included in the read reconstruction information, instead of writing back the whole contents on the copy-destination recording medium.

In this way, it becomes possible to recover the original contents securely protecting the copyright, in a short time and without increasing the processing load. Further, the data size of the after-moving reconstruction information that is recorded on the second recording medium can be made smaller in the case of making the reconstruction information using such a decryption key than in the case of making the reconstruction information based on the important information for reproduction.

Also, the present invention integrates the moved contents and the reconstruction information into one file on the copy-destination recording medium. This makes it possible to perform the recovery processing using the copy-destination recording medium even in the case where the moved contents file is moved to another recording medium.

Further, by making the reference table that is referred to at the time of recovering the contents, it becomes possible to recover the original contents in a short time.

BRIEF DESCRIPTION OF DRAWINGS

These and other objects, advantages and features of the invention will become apparent from the following description thereof taken in conjunction with the accompanying drawings that illustrate a specific embodiment of the invention. In the Drawings:

FIG. 22 is a diagram showing the data structure of an MPEG-2 packetized elementary stream in the Others;

BEST MODE FOR CARRYING OUT THE INVENTION

First Embodiment

A first embodiment of the present invention will be described below with reference to figures.

Figure 1:
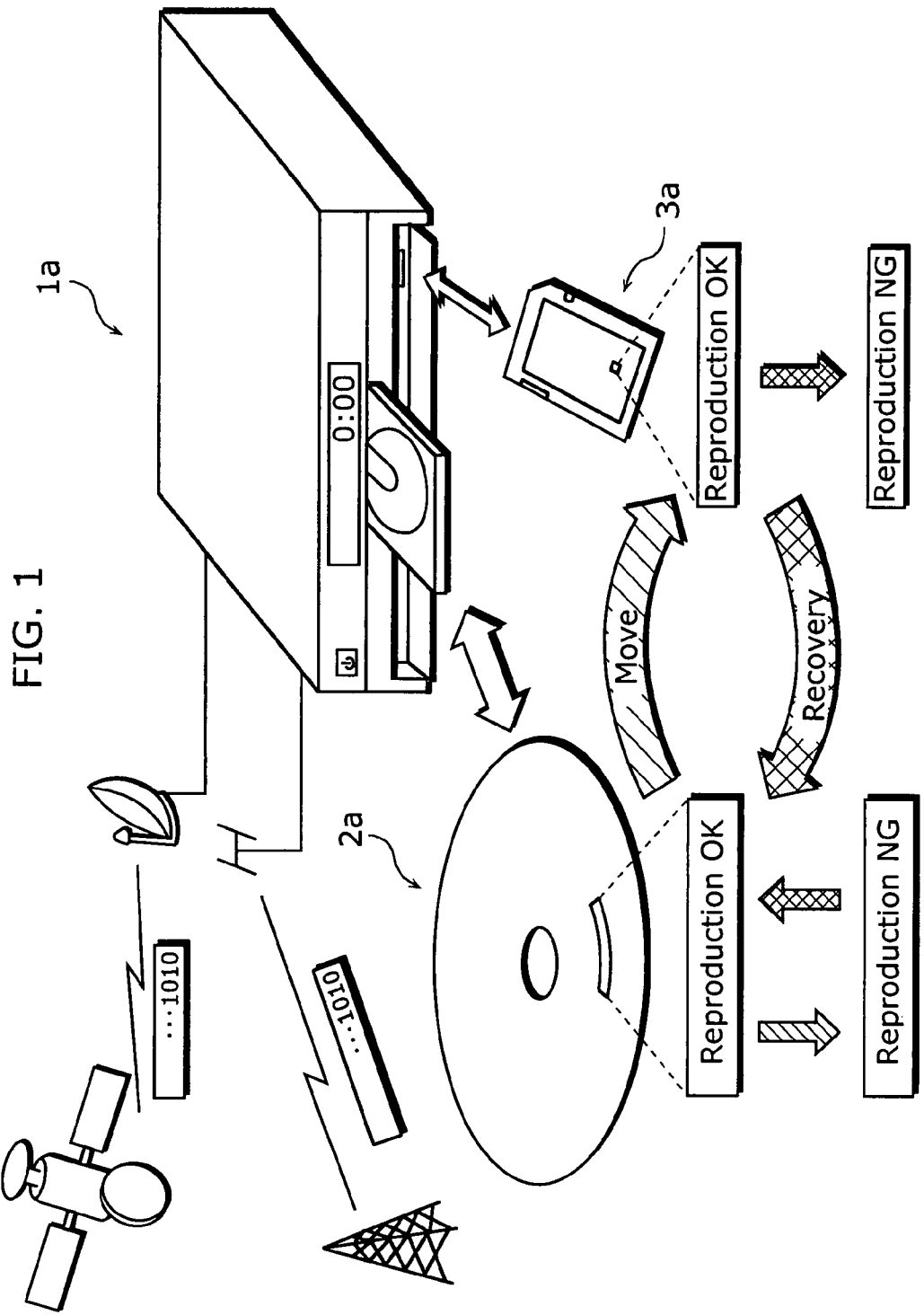
FIG. 1 an illustration of the recording and reproducing apparatus in a first embodiment of the present invention.

As shown in FIG. 1, the recording and reproducing apparatus 1a in a first embodiment of the present invention records and reproduces sound and video contents (abbreviated as simply contents hereafter) that have been broadcast via a satellite digital broadcasting, a terrestrial digital broadcasting or the like. Further, such an apparatus has a function that disables copying the contents protected by copyright although the function enables moving such contents (such a function is called content protection function).

For example, reproduction of the contents that are recorded in the first recording medium 2a is disabled at the time of moving the contents to the second recording medium 3a. After that, at the time of recovering the contents on the first recording medium 2a, the contents recorded in the second recording medium 3a are deleted or the necessary parts of the data are overwritten in order to disable reproduction, and the contents whose reproduction has been disabled are recovered in the first recording medium 2a.

Taking this into consideration, the recording and reproducing apparatus in the first embodiment will be described below.

First, the hardware structure of the recording and reproducing apparatus in the first embodiment will be described.

Figure 2:
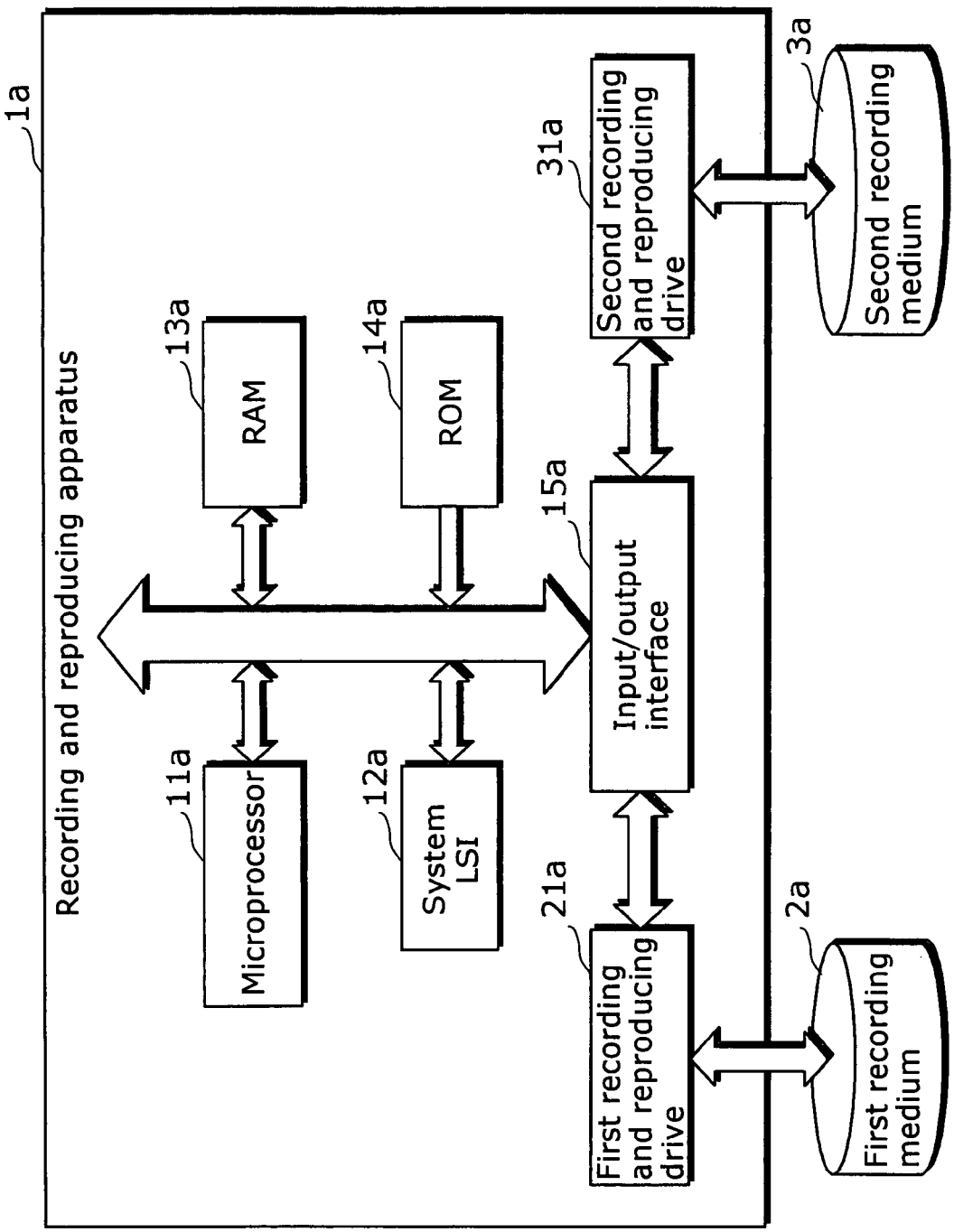
FIG. 2 is a diagram showing the functional structure of the hardware of the recording and reproducing apparatus in the first embodiment.

As shown in FIG. 2, the recording and reproducing apparatus 1a includes a microprocessor 11a, a system large scale integrated circuits (LSI) 12a, a random access memory (RAM) 13a, a read only memory (ROM) 14a and an input and output interface 15a.

The microprocessor 11a is a central processing unit that executes various processing needed in executing recording and reproducing processing.

The system LSI 112a is an integrated circuit that executes image processing needed in executing the recording and reproducing processing. An example is a codec or the like that compresses and expands images based on an image compression method such as the Moving Picture Experts Group (MPEG), the Joint Photographic Experts Group (JPEG), or H.264.

The RAM 13a is a semiconductor memory that enables data reading and writing anytime. Examples are a dynamic random access memory (DRAM), a static random access memory (SRAM) and the like.

The ROM 14a is a read-only memory. An example is an electronically erasable and programmable read only memory (EEPROM) that enables digitally rewriting the internal data.

The input and output interface 15a (not shown) inputs and outputs data to and from external apparatuses that are connected to the recording and reproducing apparatus 1a and internal apparatuses. For example, they are: (a) an interface for sound and video input and output such as analog video input and output, analog sound input and output, digital video input and output, and digital sound input and output; (b) a short-distance wireless transmission interface such as Bluetooth, the infrared data association (IrDA), and an infrared communication port; (c) a serial communication interface such as the universal serial bus (USB), the Institute of Electrical, and Electronics Engineers (IEEE) 1394 and a serial at attachment (ATA); (d) a parallel communication interface such as an at attachment packet interface (ATAPI); and (e) a network interface such as the IEEE802.3 and the IEEE802.11.

Further, the recording and reproducing apparatus 1a further includes a first recording and reproducing drive 21a and a second recording and reproducing drive 31a that are connected to the input and output interface 15a.

The first recording and reproducing drive 21a can read and write data from and on the first recording medium 2a.

The second recording and reproducing drive 31a can read and write data from and on the second recording medium 3a.

As the first recording medium 2a and the second recording medium 3a, a Blu-ray disc rewritable (BD-RE), a hard disc drive (HDD), a DVD-RAM, a secure digital (SD) memory card and the like are available.

Note that the ROM 14a stores the following (not shown): an installed operating system that controls the recording and reproducing apparatus 1a, a device driver that is needed when the OS controls peripheral apparatuses, middleware that operates under the OS, an application software such as a user interface (called recording and reproducing apparatus control program hereafter). After that, the recording and reproducing apparatus control program is read out from the ROM 14a and stored on the RAM 13a when the power of the recording and reproducing apparatus 1a is turned on. In this way, with the recording and reproducing apparatus 1a, respective functions in the present invention are realized.

Consequently, the functional structure of the recording and reproducing apparatus in the first embodiment of the present invention will be described below.

Figure 3:
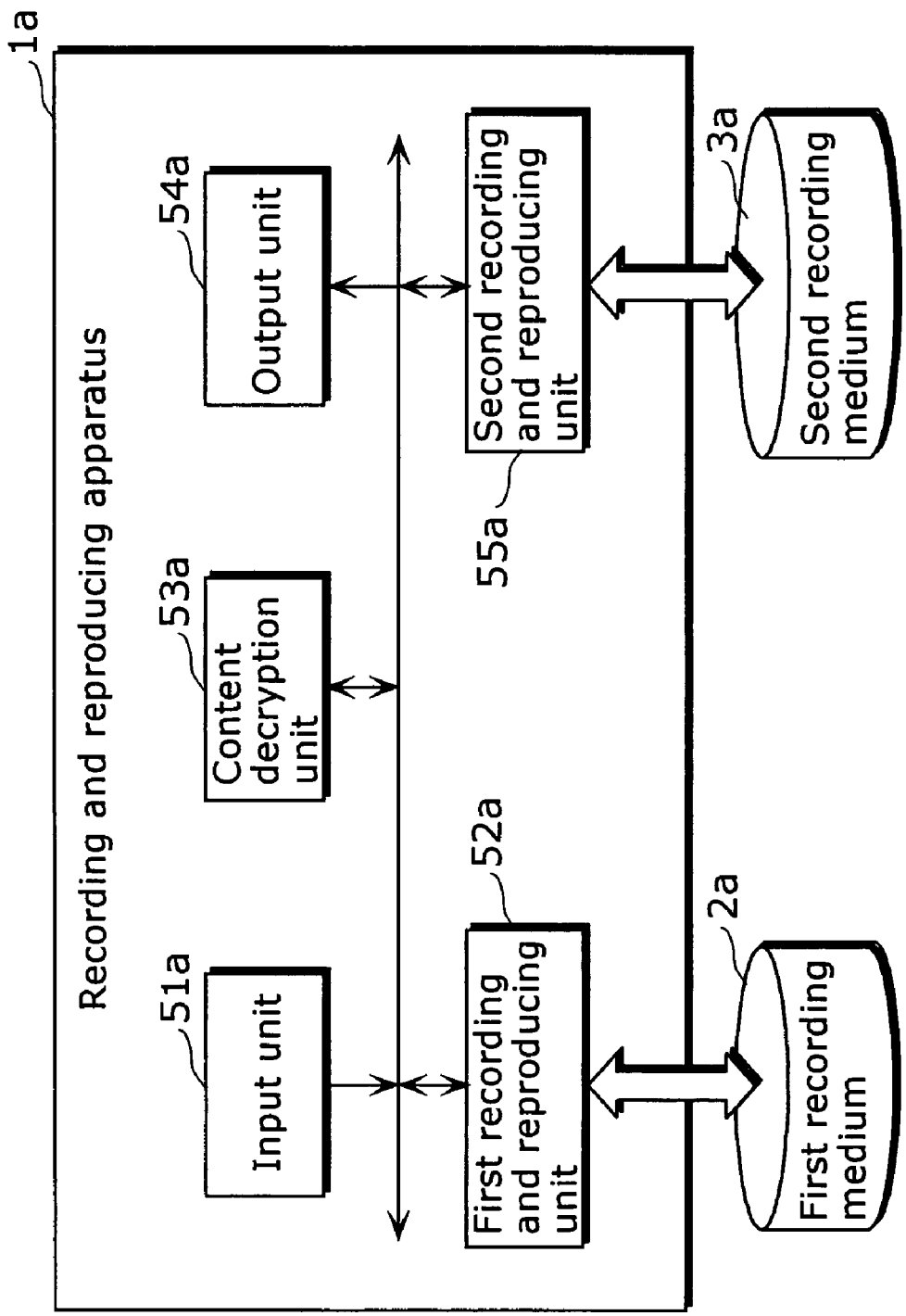
FIG. 3 is a diagram showing the functional structure of the recording and reproducing apparatus in the first embodiment.

As shown in FIG. 3, the recording and reproducing apparatus 1a includes an input unit 51a, a first recording and reproducing apparatus 52a, a content decryption unit 53a, an output unit 54a, a second recording and reproducing unit 55a and the like.

The input unit 51a decodes a digital television broadcasting signal that is selected via a tuner (the signal is not shown) and outputs the decoded digital television broadcasting signal as contents to the first recording and reproducing unit 52a. Also, operation information concerning user's indication or settings is received via a remote controller or the like, and outputs the received operation information to the first recording and reproducing unit 52a.

The first recording and reproducing unit 52a records the contents that are outputted from the input unit 51a, performs necessary processing on the outputted contents and writes the contents on the first recording medium 2a. For example, the first recording and reproducing unit 52a rewrites copy-once control signals, which are included in the contents protected by copyright, as copy-never control signals.

Also, the first recording and reproducing unit 52a reproduces the contents that are recorded in the first recording medium 2a by reading the contents to be reproduced from the first recording medium 2a and outputting the read contents to the content decryption unit 53a.

The content decryption unit 53a decrypts the contents that are outputted from the first recording and reproducing unit 52a to generate sound and video signals and outputs the decrypted sound and video signals to the output unit 54a.

The output unit 54a outputs the sound and video signals that have been outputted from the content decryption unit 53a to an external apparatus such as a display and a speaker that are not shown.

Further, the first recording and reproducing unit 52a moves the contents protected by copyright from the first recording medium 2a to the second recording medium 3a by reading the contents should be moved from the first recording medium 2a and outputting the read contents to the second recording and reproducing unit 55a.

The second recording and reproducing unit 55a performs necessary processing on the contents that have been outputted from the first recording and reproducing unit 52a and writes the contents on the second recording medium 3a.

Next, a detailed functional structure of the recording and reproducing apparatus in this first embodiment will be described below. Here, the first recording and reproducing unit 52a will be mainly described.

Figure 4A:
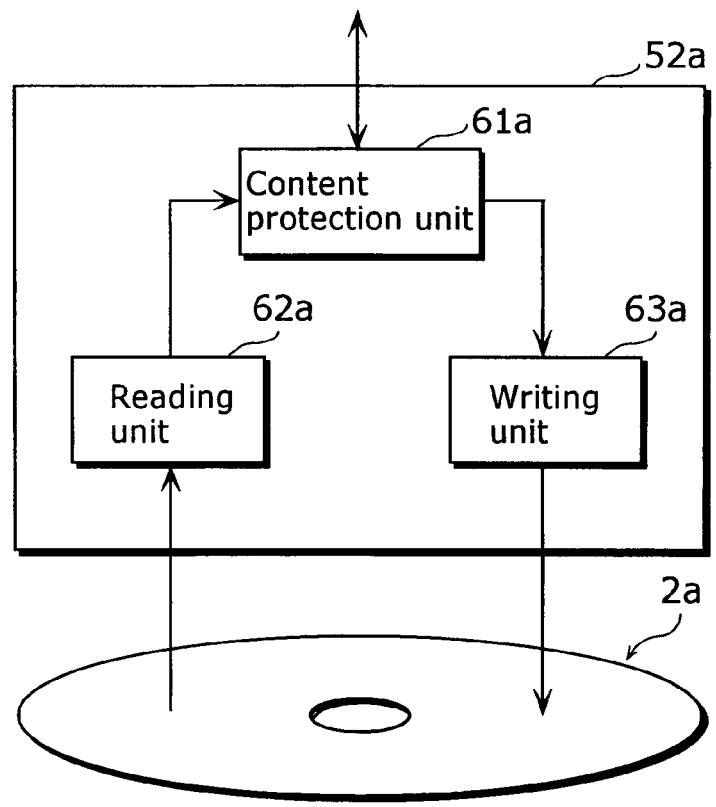
FIGS. 4A and 4B are diagrams respectively showing detailed functional structures of the recording and reproducing apparatus in the first embodiment.

As shown in FIG. 4A, the first recording and reproducing unit 52a includes a content protection unit 61a, a reading unit 62a and a writing unit 63a.

The content protection unit 61a has a content protection function, and protects the contents and the copyright of the contents recorded in the first recording medium 2a.

The reading unit 62a reads the contents that are specified as the contents to be read from the first recording medium 2a.

The writing unit 63a writes the contents that are specified as the contents to be written on the first recording medium 2a.

Figure 4B:
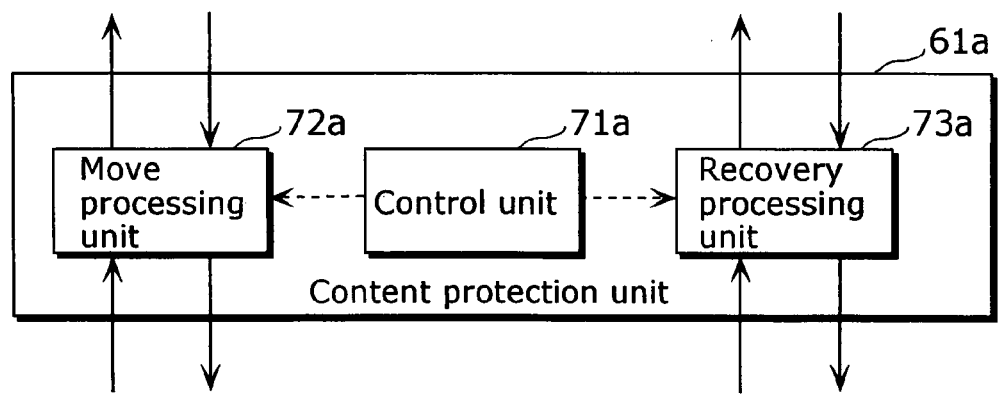

As shown in FIG. 4B, the content protection unit 61a further includes a control unit 71a, a move processing unit 72a and a recovery processing unit 73a.

The control unit 71a performs one of the following processing (1) and (2) according to the operation information outputted from the input unit 51a, that is, the operation information inputted by a user:

(1) in the case of moving a part of or the whole contents, the move processing unit 72a is controlled to execute the move processing; and
(2) in the case of recovering a part of or the whole contents, the recovery processing unit 73a is controlled to execute the recovery processing.

The move processing unit 72a reads a part of or the whole contents to be moved (called data to be moved hereafter) from the first recording medium 2a, and outputs the read data to be moved to the second recording and reproducing unit 55a. Also, important information for reproduction is extracted from the data to be moved that is recorded in the first recording medium 2a, and rewrite the important information after extraction in order to disable reproduction. Next, the move processing unit 72a outputs (a) the data to be moved to the second recording and reproducing apparatus 55a, (b) terminal information of the data to the second recording and reproducing unit 55a, and (c) one or more pieces of important information for reproduction that are extracted from the data to be moved, as reconstruction information, to the second recording and reproducing unit 55a.

The recovery processing unit 73a reads the reconstruction information recorded, on the second recording medium 3a, in association with a part of or the whole contents to be recovered (called the data to be recovered hereafter), and recovers the data to be recovered by using one or more pieces of important information for reproduction that are included in the read reconstruction information. Next, the recovery processing unit 73a gradually recovers the data to be recovered, and deletes the contents recorded, on the second recording medium 3a, in association with the data to be recovered.

Note that the second recording and reproducing unit 55a may have the same structure as the first recording and reproducing unit 52a does, or may have a structure without the content protection unit 61a, unlike the first recording and reproducing unit 52a.

Note that one of the following (a) to (c) may be employed as a method for rewriting data in order to disable reproduction:

(a) deleting data and letting the space remain blank;
(b) overwriting data with irrelevant data, for example, data whose bits are represented as 1s or 0s; and
(c) encrypting data using a unique encryption key that is included inside the recording and reproducing apparatus 1a.

Figure 5:
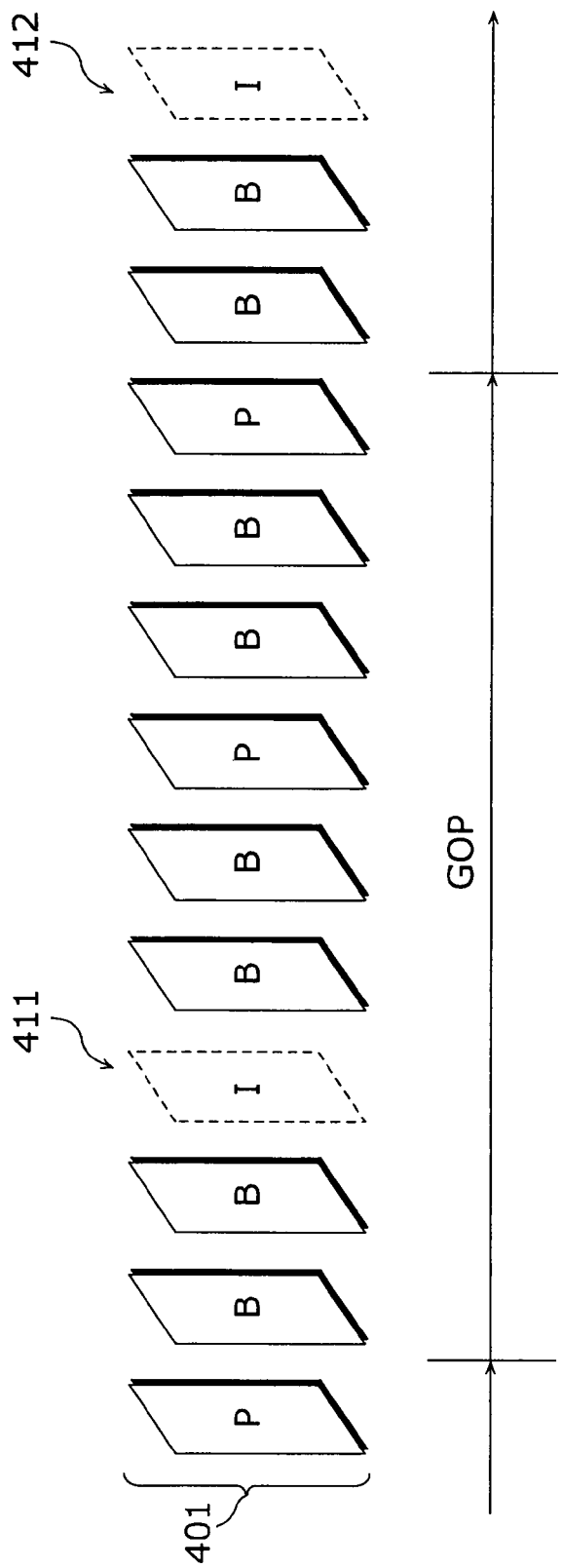
FIG. 5 is a diagram showing an example of the important information for reproduction (that is, I pictures in this figure) in the first embodiment.

Here, "important information for reproduction" is important in reproducing contents. For example, as shown in FIG. 5, the I pictures 421 and 422 that constitute a group of picture (GOP) that is the data of the contents 401 are header information or the like.

Next, the content data structures represented before and after move processing is executed by the recording and reproducing apparatus in the first embodiment will be described below.

Figure 6:
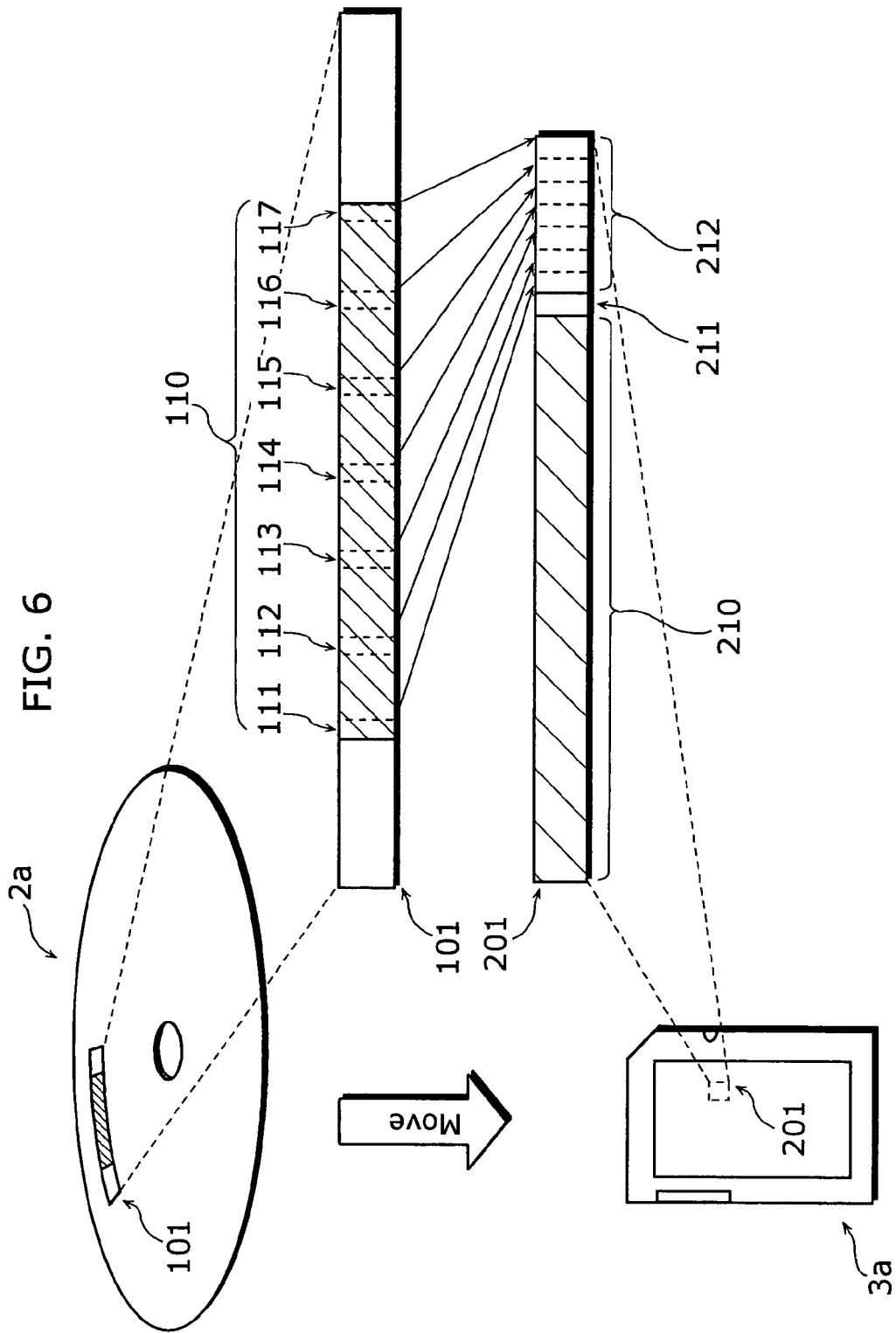
FIG. 6 is a first illustration showing the content data structures represented before and after move processing is executed by the recording and reproducing apparatus in the first embodiment.
Figure 7:
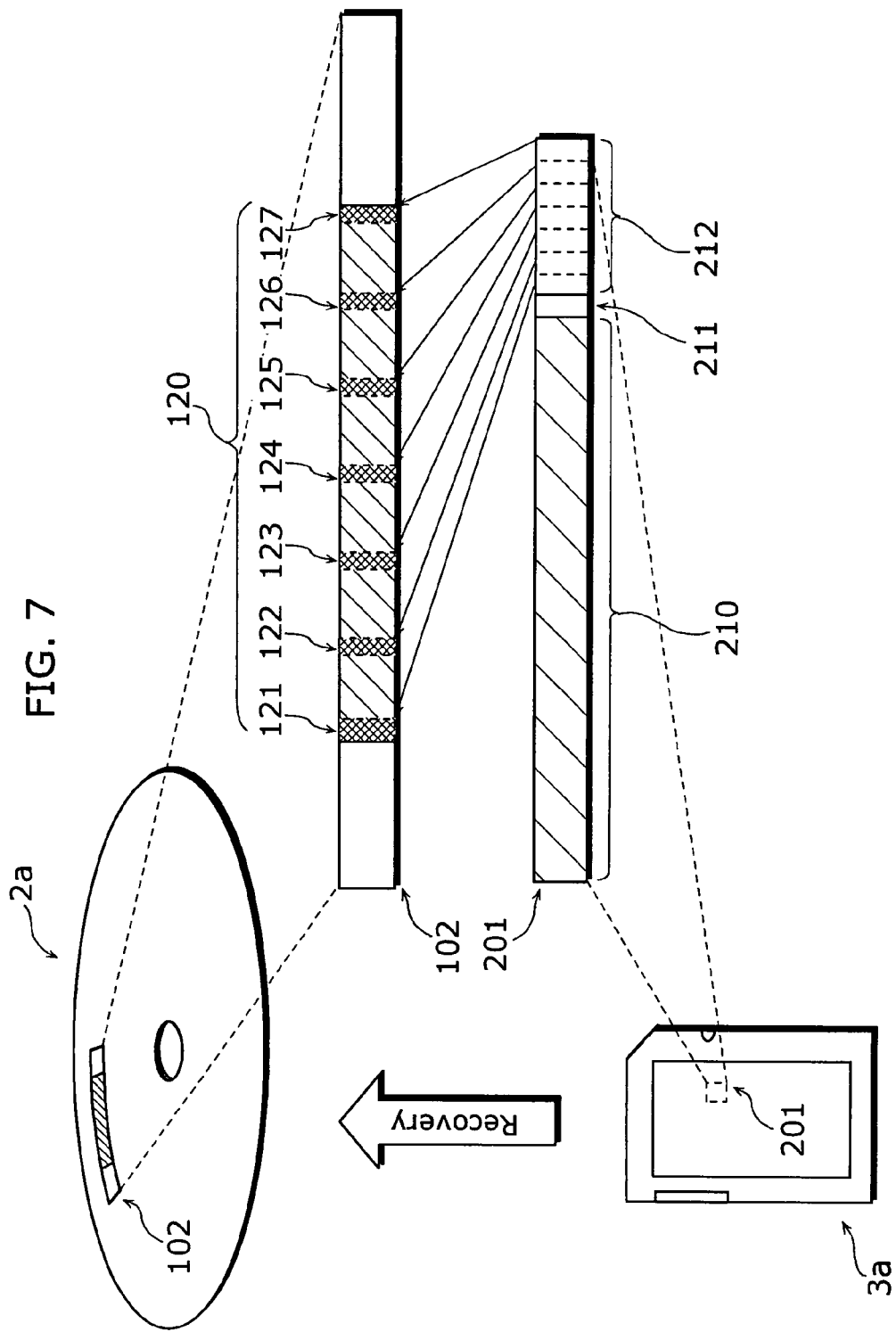
FIG. 7 is a second illustration showing the content data structures that are respectively shown before and after move processing in the recording and reproducing apparatus in the first embodiment.

FIG. 6 and FIG. 7 show that: before the move processing is executed the contents 101 is recorded in the first recording medium 2a; at the time of executing the move processing, a part 110 of the contents 101 is moved to the second recording medium 3a; after the move processing is executed the contents 102 is recorded on the first recording medium 2a; and, the contents 201 is newly recorded on the second recording medium 3a.

Here, the contents 102 are derived from the contents 101 after the parts 111 to 117 of the contents 101 are rewritten in order to disable reproduction.

The contents 201 includes a part 210 that corresponds to the part 110 that is moved from the first recording medium 2a and the second recording medium 3*a*, a part 211 that corresponds to terminal information, and a part 212 that corresponds to the reconstruction information, these parts being placed in the above-listed order from the top of the contents.

Here, "terminal information" indicates the end of the section to be reproduced in the contents. An example is "sequence_end_code" of the MPEG standard.

Also, "reconstruction information" is used in reproducing the parts that have been rewritten in order to disable reproduction at the time of moving the parts. An example is the information that corresponds to the important information for reproduction that has been extracted from the parts 111 to 117.

For example, like in the case of the contents 201, integrating the data including the parts 210, 211 and 212 in this order into one file makes it possible to perform the recovery processing using the copy-destination recording medium even in the case where the contents 201 are moved to another recording medium. Also, it becomes possible to prevent the occurrence of a malfunction when reproducing the contents from the top of the file because terminal information (the information indicating the end of the section to be reproduced) is included in the part 211 and the terminal information enables preventing the reconstruction information from being read and reproduced next to the part 210. Further, placing the reconstruction information at the last of the file, in other words, placing the reconstruction information after the movable parts are determined makes it possible to simplify the data structure.

Next, the content data structures represented before and after recovery processing is executed by the recording and reproducing apparatus in the first embodiment will be described below FIG. 6 and FIG. 7 show that: before the recovery processing is executed the contents 102 are recorded in the first recording medium 2*a*; at the time of executing the recovery processing, a part 212 of the contents 201 are moved to the first recording medium 2*a*; after the recovery processing is executed the contents 201 are deleted from the second recording medium 3*a*; and, the contents 101 are recovered on the first recording and reproducing medium 2*a*.

Here, the contents 101 are derived from the contents 102 after the parts 121 to 127 of the contents 101 are recovered using the reconstruction information included in the part 212 that is read from the second recording medium 3*a*.

The move processing unit 72*a* rewrites the important information for reproduction of the parts 111 to 117 of the contents 101 in order to disable reproduction.

The recovery processing unit 73*a* reads the part 212 of the contents 201 from the second recording medium 3*a* and recovers the parts 121 to 127 that are rewritten in order to disable reproduction at the time of recovering the part 120 of the contents 102. At this time, the one or more pieces of important information for reproduction included in the read reconstruction information are written back on the original parts, with reference to the reference table (refer to FIG. 7).

Next, the following description relates to the data structure of the reference table that is referred to at the time of recovering the contents that have been rewritten so that the recording and reproducing apparatus in the first embodiment can disable the reproduction of the contents.

Figure 8:
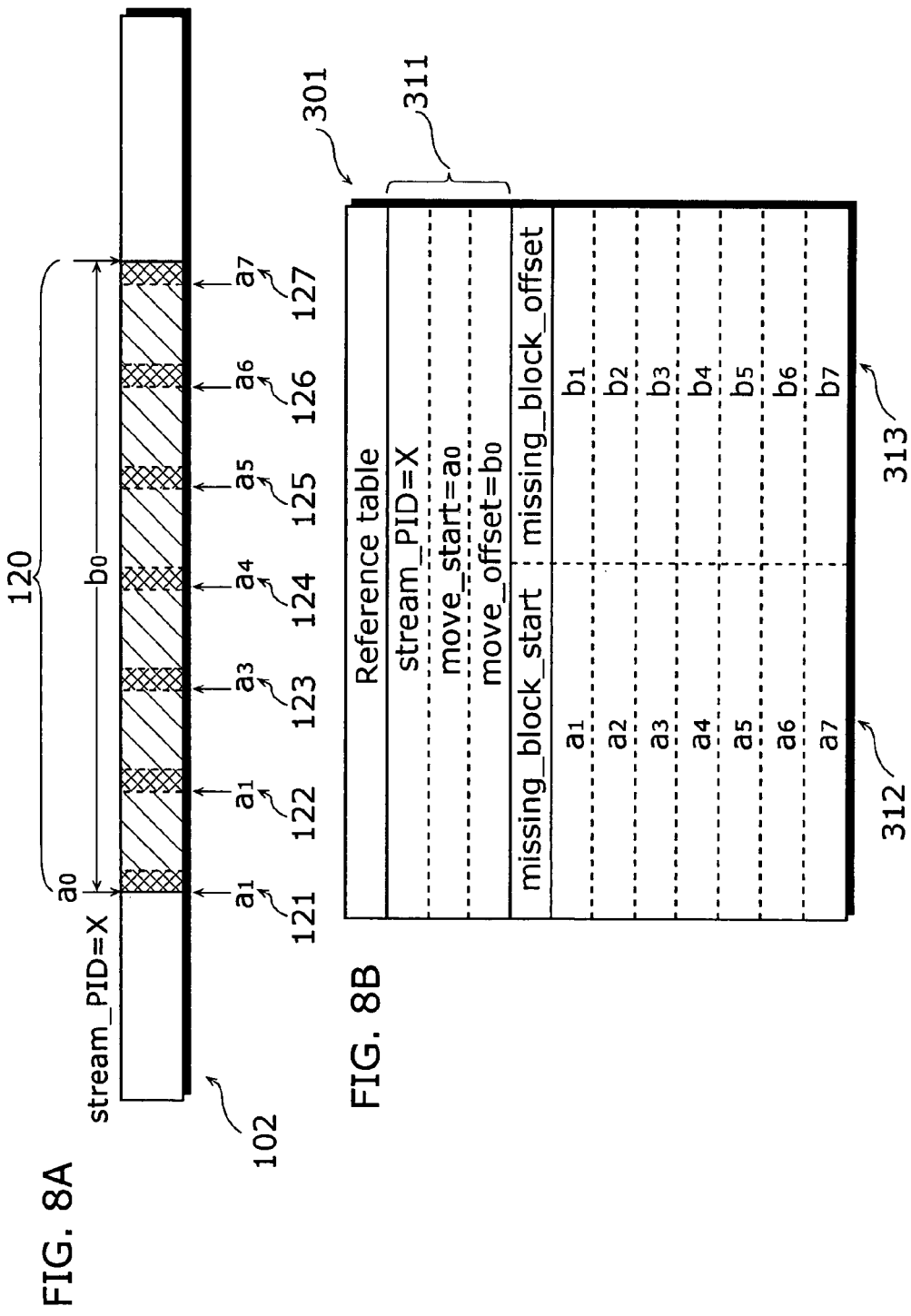
FIG. 8A is an illustration of the data structure of a stream.
FIG. 8B is a diagram showing the data structure of a reference table that is referred to at the time of recovering the contents whose data has been rewritten in order to disable reproduction in the recording and reproducing apparatus in the first embodiment.

As shown in FIG. 8B, the reference table 301 includes an area 311 where the information concerning the parts on which move processing is performed, a column 312 where start addresses of the respective parts 121 to 127 are registered and a column 313 where offsets of the respective parts 121 to 127 are registered.

Here is an example of the part 120 that has been rewritten in order to disable reproduction because move processing is performed on the part. The following information, address and offset are shown in the area 311: "stream_PID=X" that is the identification information of the contents 102; "move_start=a0" that is the start address of the part 120; and "move_offset=b0" that is the offset of the part 120. In the area 312 "missing_block_start=a1" that is the start address of the part 121 is shown. Also, in the column 313 "missing_block_offset=b1" that is the offset of the part 121 is shown.

Note that the reference table 301 is generated at the time when the move processing is performed on the part 120, and recorded on the first recording medium 2*a*.

Next, the move processing and the recovery processing that are executed by the recording and reproducing apparatus in the first embodiment will be described below.

Figure 9:
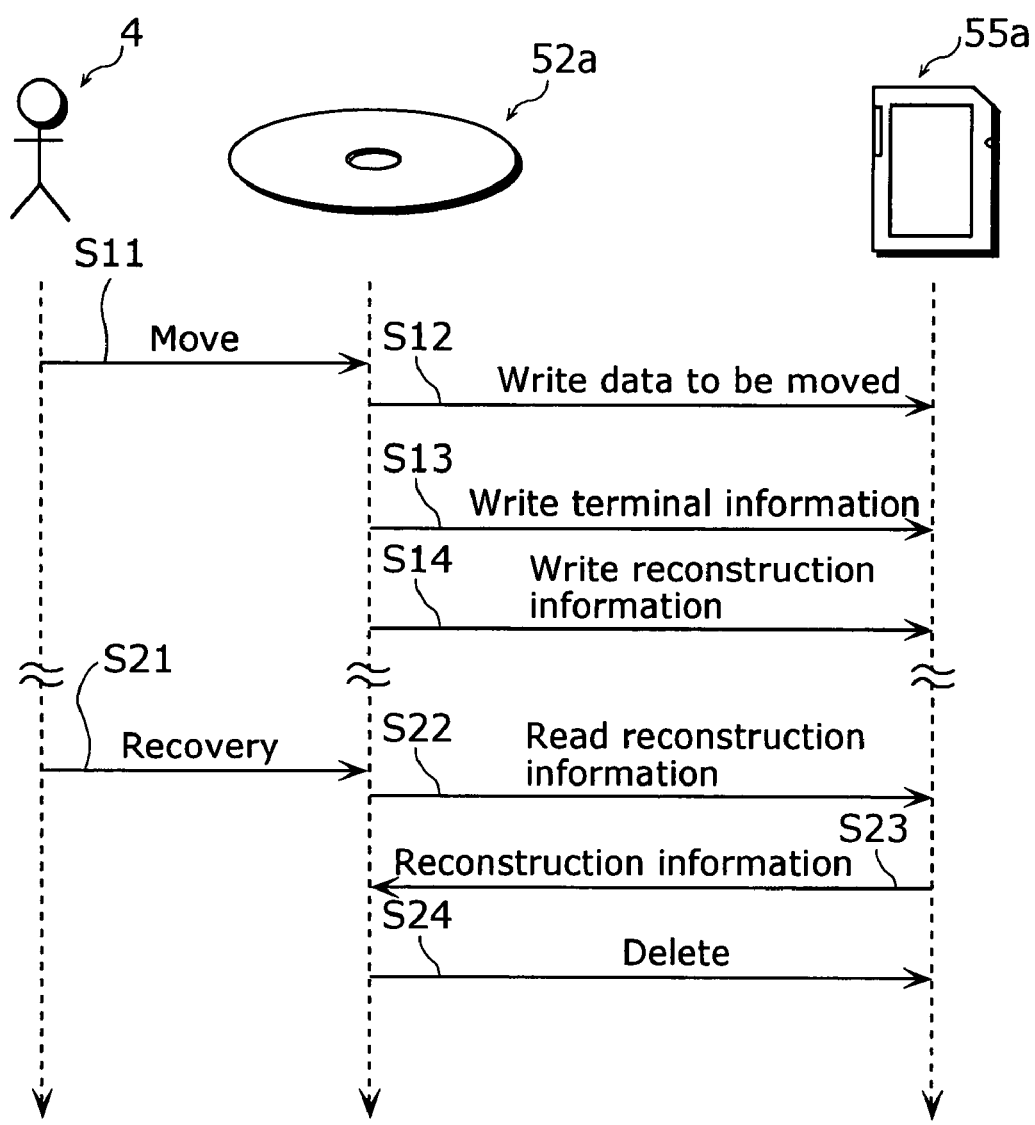
FIG. 9 is a diagram showing the sequence from move processing to recovery processing that are executed by the 1-5 recording and reproducing apparatus in the first embodiment.

As shown in FIG. 9, the control unit 71*a* performs one of the following processing (a) and (b) in response to a request from a user 4.

The processing (a) is executed in the case of receiving a move request (sequence S11). The move processing unit 72*a* is controlled to execute this move processing, as will be described below.

Figure 10:
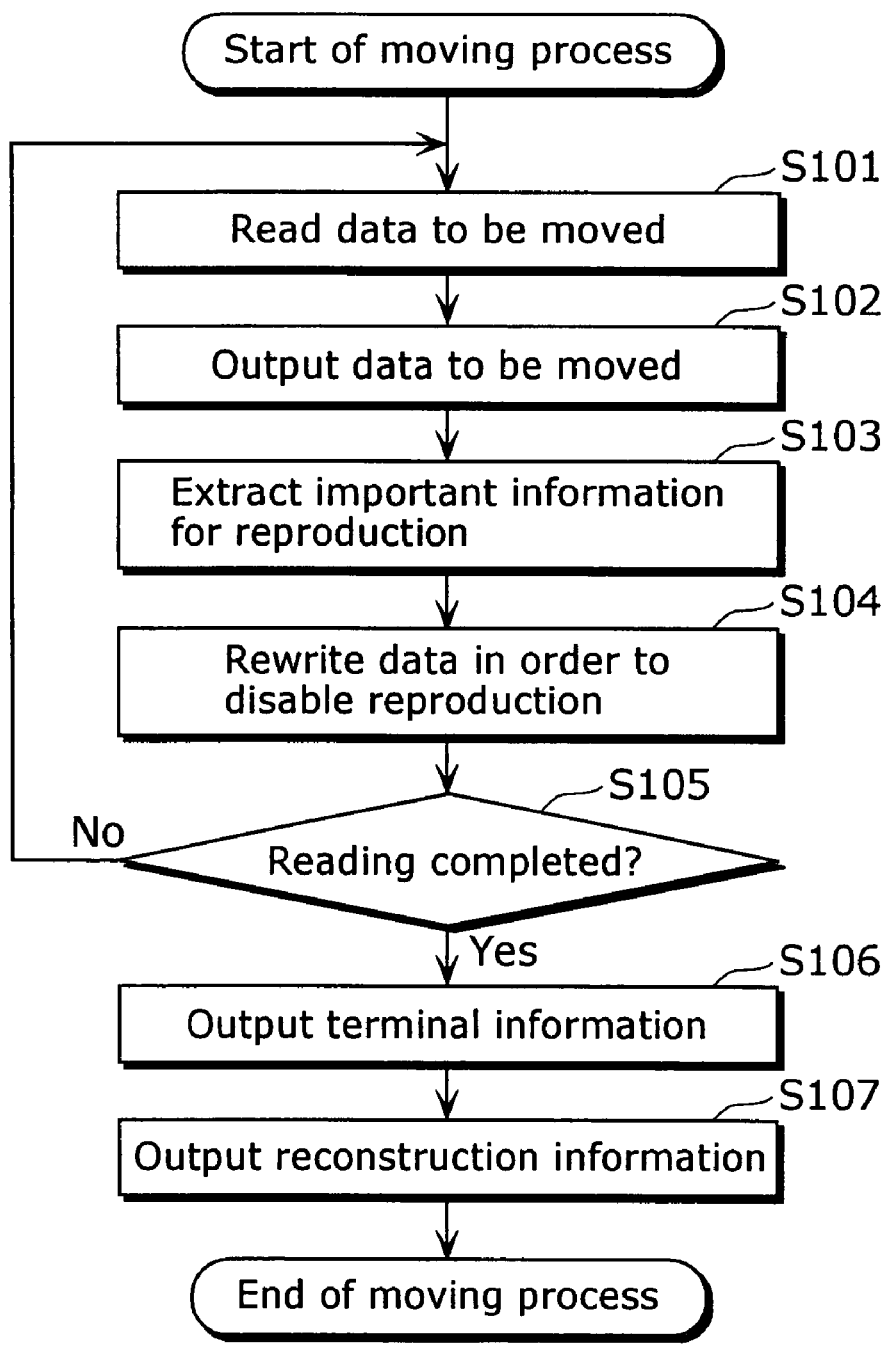
FIG. 10 is a flow chart showing the move processing that is executed by the recording and reproducing apparatus in the first embodiment.

As shown in FIG. 9 and FIG. 10, the move processing unit 72*a* reads, from the first recording medium 2*a*, the data to be moved that is specified by the move request that has been received by the control unit 71*a* (step S101) and outputs, to the second recording and reproducing unit 55*a*, the writing request to the read data to be moved (step S102).

On the other hand, the second recording and reproducing unit 55*a* receives the writing request that is outputted from the move processing unit 72*a* and writes, to the second recording medium 3*a*, the data to be moved that has been received together with the writing request (step S12).

Also, the move processing unit 72*a* extracts the important information for reproduction from the data to be moved that is recorded in the first recording medium 2*a* (step S103) and rewrites the important information for reproduction that corresponds to the extracted parts in order to disable reproduction (step S104). After that, the move processing unit 72*a* outputs the data to be moved to the second recording and reproducing unit 55*a* (step S105) and outputs, to the second recording and reproducing unit 55*a*, the writing request to the terminal information (step S106).

On the other hand, the second recording and reproducing unit 55*a* receives the writing request that is outputted from the move processing unit 72*a* and additionally writes, on the second recording medium 3*a* on which the data to be moved has already been written, the terminal information that has been received together with the writing request (sequence S13).

Further, the move processing unit 72*a* constitutes the reconstruction information based on the one or more pieces of important information for reproduction that have been extracted from the data to be moved recorded in the first recording medium and outputs the writing request to the constituted reconstruction information to the second recording and reproducing unit 55*a* (step S107

On the other hand, the second recording and reproducing unit 55*a* receives the writing request outputted from the move processing unit 72*a* and additionally writes, on the second recording medium 3*a* on which the data to be moved has already been written, the reconstruction information that has been received together with the writing request (sequence S14).

At this point, the move processing unit 72a completes the move processing.

The processing (b) is executed in the case of receiving a recovery request (sequence S21). The recovery processing unit 73a is controlled to execute this recovery processing as will be described below.

Figure 11:
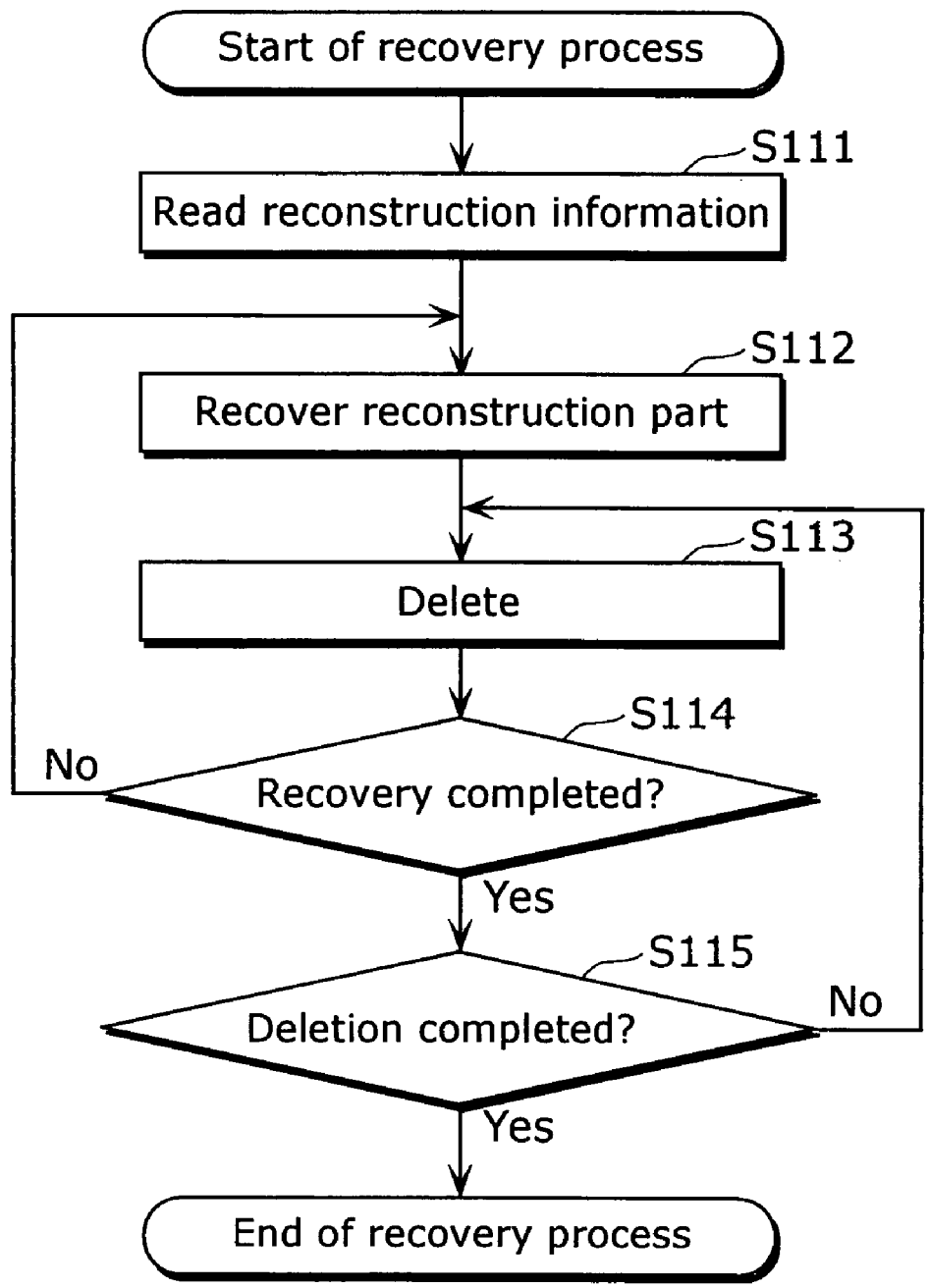
FIG. 11 is a flow chart showing the recovery processing that is executed by the recording and reproducing apparatus in the first embodiment.

As shown in FIG. 9 and FIG. 11, the recovery processing unit 73a outputs, to the second recording and reproducing unit 55a, the reading request corresponding to the reconstruction information that is recorded in the second recording medium 3a in association with a part of or the whole contents (called data to be recovered hereafter) specified by the recovery request that has been received by the control unit 71a (sequence S22).

On the other hand, the second recording and reproducing unit 55a receives the reading request outputted from the recovery processing unit 73a, reads the reconstruction information specified by the received reading request from the second recording medium 3a (step S111) and sends the read reconstruction information to the recovery processing unit 73a (sequence S23).

Further, the recovery processing unit 73a receives the reconstruction information sent from the second recording and reproducing unit 55a and recovers the recovery parts in the data to be recovered, by using the one or more pieces of important information for reproduction that are included in the received reconstruction information (step S112). Also, while recovering the data to be recovered, the recovery processing unit 73a outputs, to the second recording and reproducing unit 55a, the deletion request to the contents recorded in the second recording medium 3a in association with the data to be recovered (sequence S24).

On the other hand, the second recording and reproducing unit 55a receives the deletion request outputted from the recovery processing unit 73a and deletes, from the second recording medium 3a, the contents specified by the received deletion request (step S113).

At the time when the data to be recovered is recovered (step S14), and the contents recorded in the second recording medium 3a in association with the data to be recovered are deleted (step S115), the recovery processing unit 73a completes the recovery processing.

As described up to this point, the recording and reproducing apparatus in the first embodiment rewrites the important information for reproduction included in a part of or the whole contents to be moved in order to disable reproduction, at the time when the part of or the whole contents protected by copyright is moved from the first recording medium to the second recording medium.

Before rewriting it in order to disable reproduction, the important information for reproduction is extracted, the reconstruction information is constituted based on the extracted one or more pieces of important information for reproduction, and the constituted reconstruction information is recorded in the second recording medium in association with the contents in the copy-destination recording medium. Further, at the time of recovering the original contents based on the remaining contents that are recorded in the original recording medium, the reconstruction information recorded in association with the contents in the copy-destination recording medium is read out. In other words, there is no need to write back the whole contents. Next, the parts to be rewritten in order to disable reproduction are overwritten by using the one or more pieces of important information for reproduction included in the read reconstruction information. At this point, the recovery of the original contents is completed.

In this way, it is possible to recover the original contents securely protecting the copyright of the contents, in a short time and without increasing the processing workload.

Second Embodiment

Next, a second embodiment of the present invention will be described with reference to figures.

The recording and reproducing apparatus in the second embodiment of the present invention generates a key and encrypts the important information for reproduction at the time of executing the move processing. The feature of the recording and reproducing apparatus is that it records, on the second recording medium, the decryption key used for decrypting the encrypted important information for reproduction in association with the contents in the copy-destination recording medium.

Taking this point into consideration, the recording and reproducing apparatus in the second embodiment will be described below. Note that the same components as the ones in the first embodiments are respectively given the same reference numbers, and descriptions for such components will be omitted here.

First, a detailed functional structure of the recording and reproducing apparatus in this second embodiment will be described below. Here, the content protection unit will be mainly described.

Figure 12:
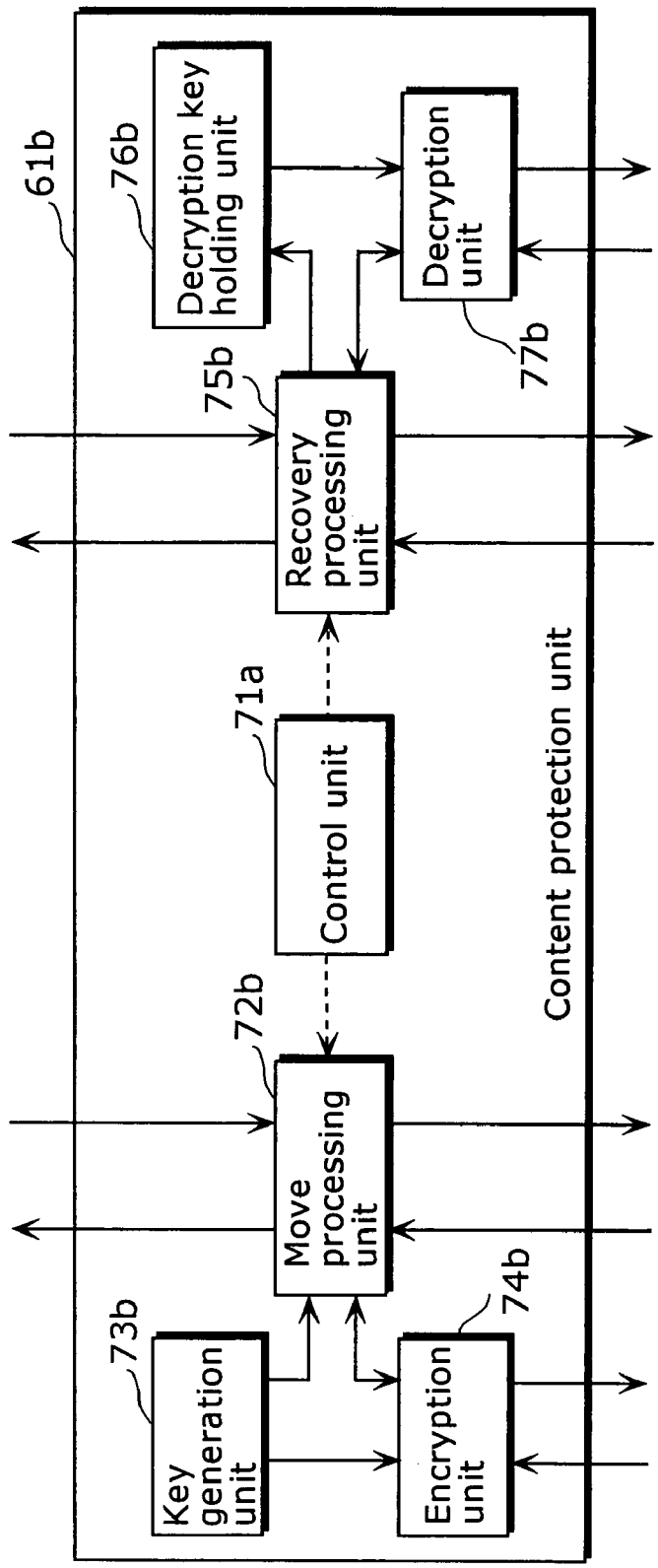
FIG. 12 is a diagram showing a detailed functional structure of the recording and reproducing apparatus of a second embodiment of the present invention.

As shown in FIG. 12, the content protection unit 61b differs from the content protection unit 61a in the following points (a) and (b).

(a) The content protection unit 61b has a move processing unit 72b instead of the move processing unit 72a. In addition, it has a key generation unit 73b and an encryption unit 74b.

Figure 16:
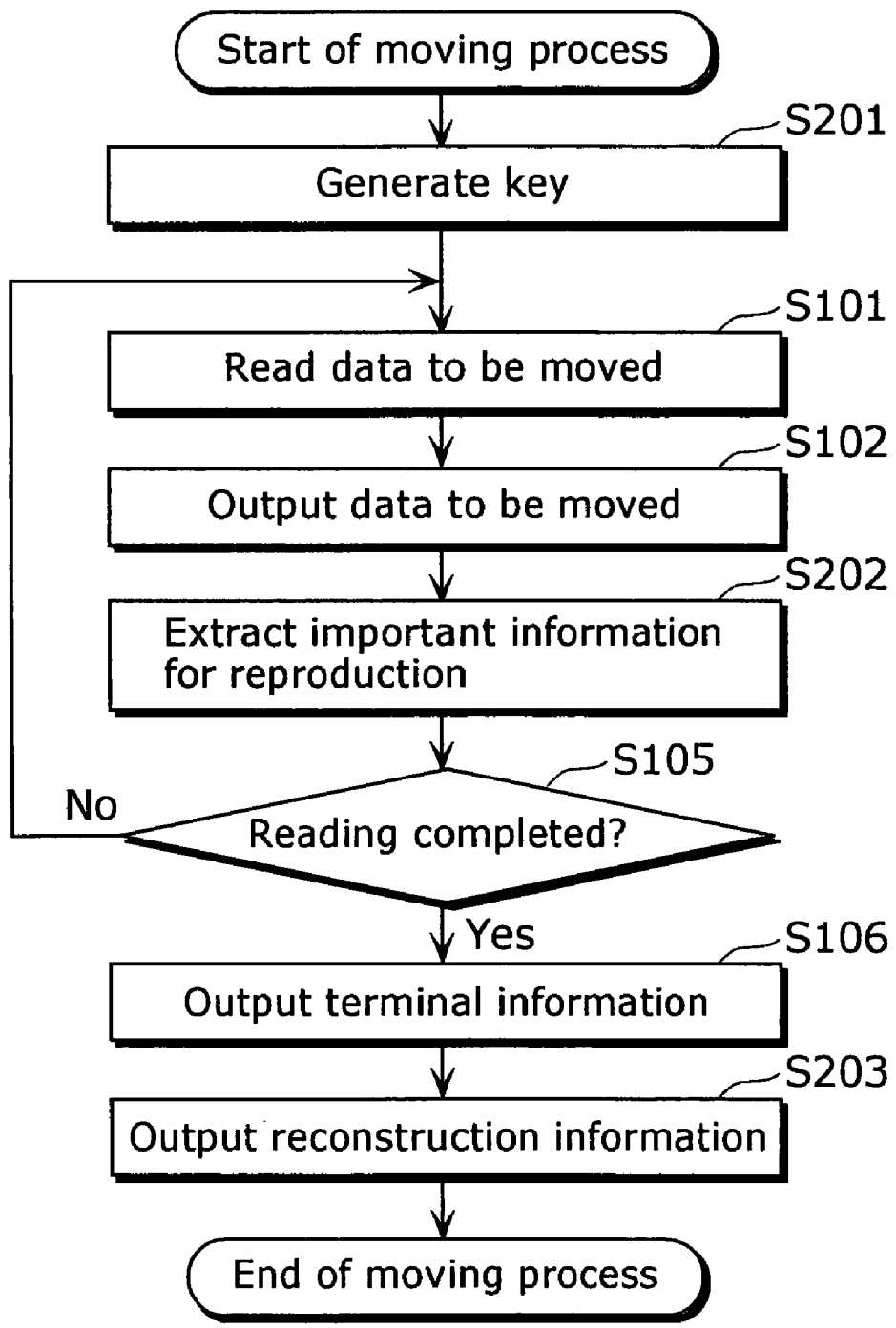
FIG. 16 is a flow chart showing the move processing that is executed by the recording and reproducing apparatus in the second embodiment.

Unlike the move processing unit 72a, the move processing unit 72b rewrites the important information for reproduction included in the part or the whole contents to be moved by encrypting it in order to disable reproduction, at the time of executing the move processing (refer to FIG. 16).

The key generation unit 73b generates an encryption key that is used in encrypting the data and a decryption key that is used in decrypting the encrypted data.

The encryption unit 74b encrypts the important information for reproduction included in the part of or the whole contents to be moved.

(b) The content protection unit 61b has a recovery processing unit 75b instead of the recovery processing unit 75a. In addition, it has a decryption key generation unit 76b and a decryption unit 77b.

Figure 17:
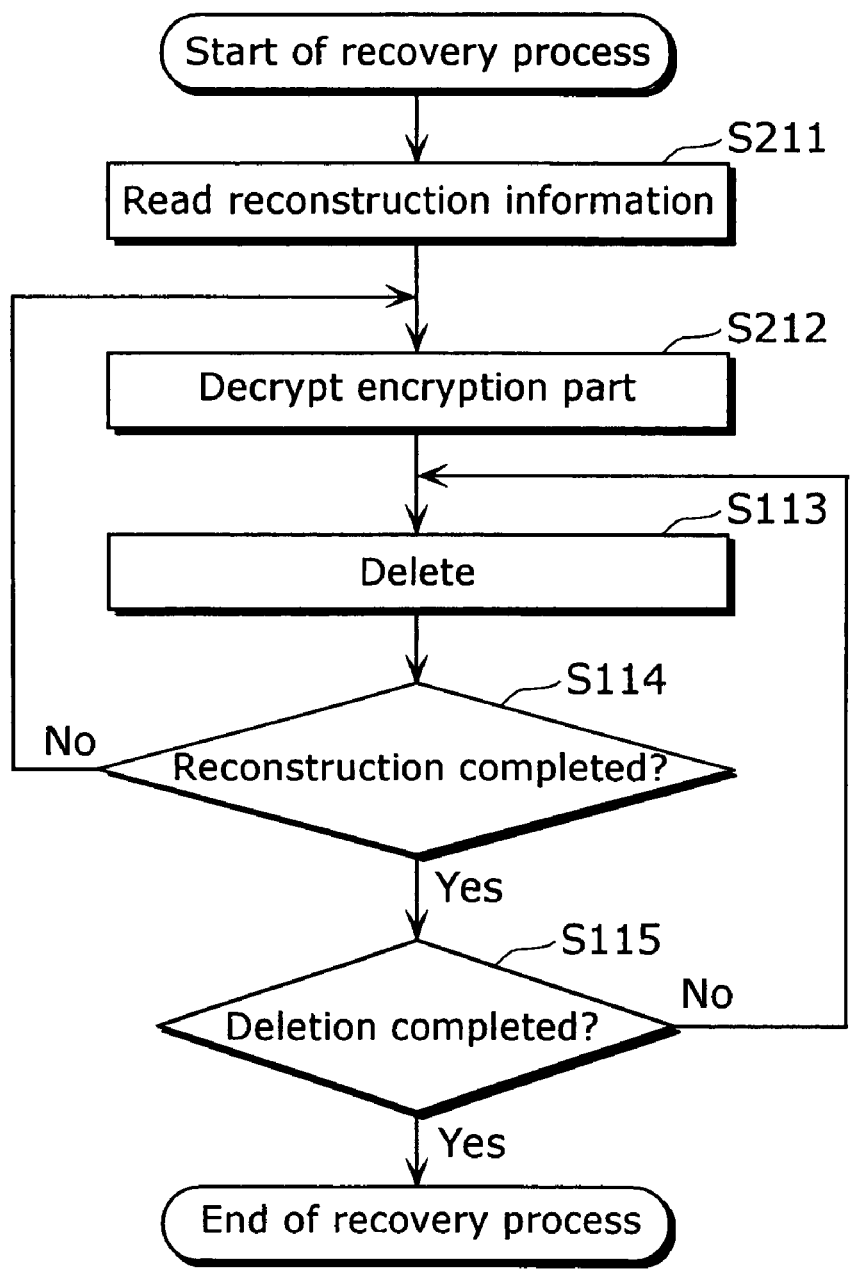
FIG. 17 is a flow chart showing the move processing that is executed by the recording and reproducing apparatus in the second embodiment.

Unlike the recovery processing unit 75a, the recovery processing unit 75b extracts the decryption key from the contents recorded in the second recording medium in association with the contents to be recovered and decrypts the decryption parts included in the part or the whole contents to be recovered by using the extracted decryption key, at the time of executing the recovery processing (refer to FIG. 17).

The decryption key holding unit 76b holds the extracted decryption key.

The decryption unit 77b decrypts the encrypted important information for reproduction using the decryption key that is held in the decryption key holding unit 76b.

Next, the content data structures represented before and after move processing is executed by the recording and reproducing apparatus in the second embodiment will be described below.

Figure 13:
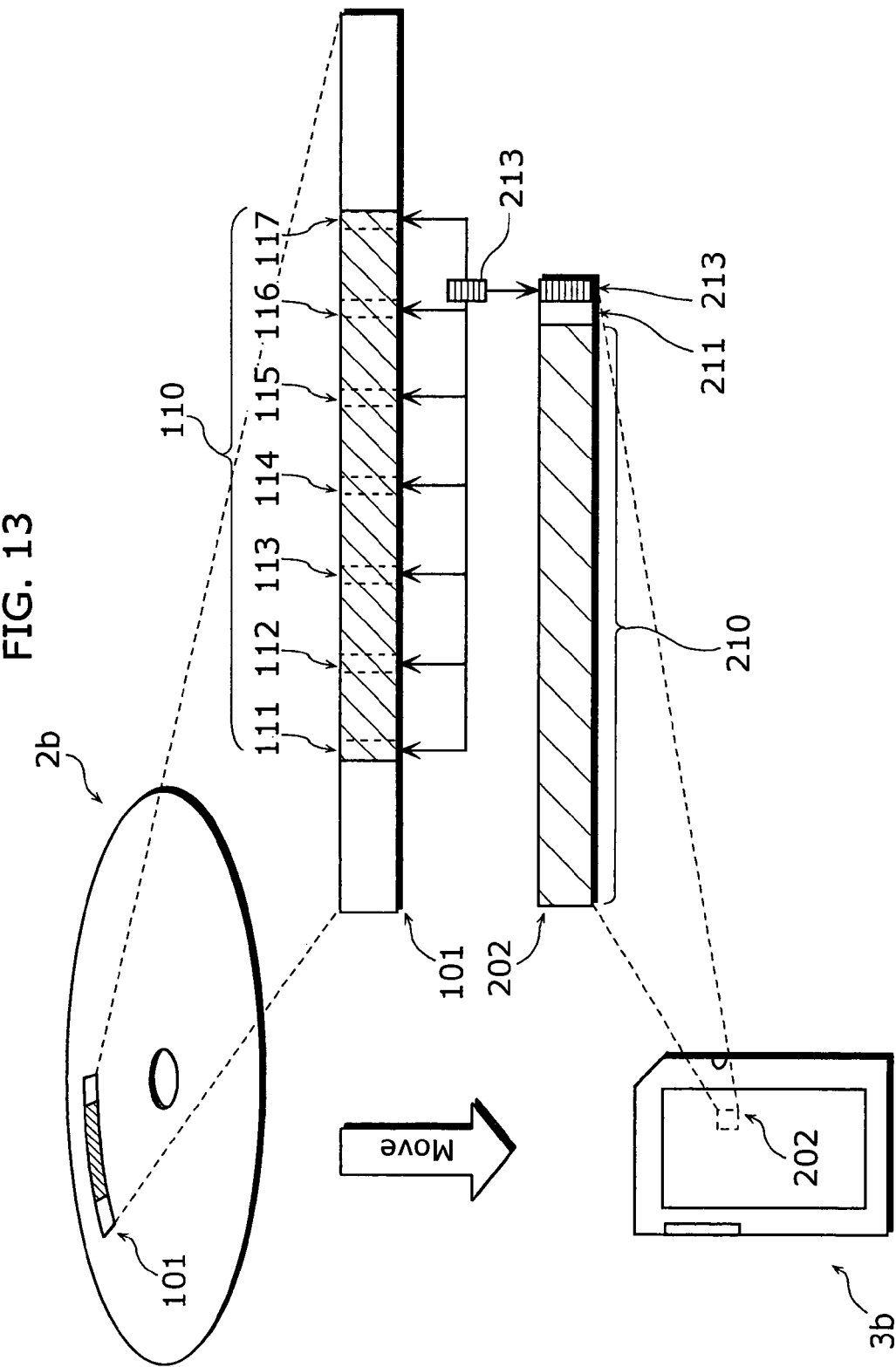
FIG. 13 is a first illustration showing the data structure of the contents that are respectively shown before and after move processing in the recording and reproducing apparatus in the second embodiment.
Figure 14:
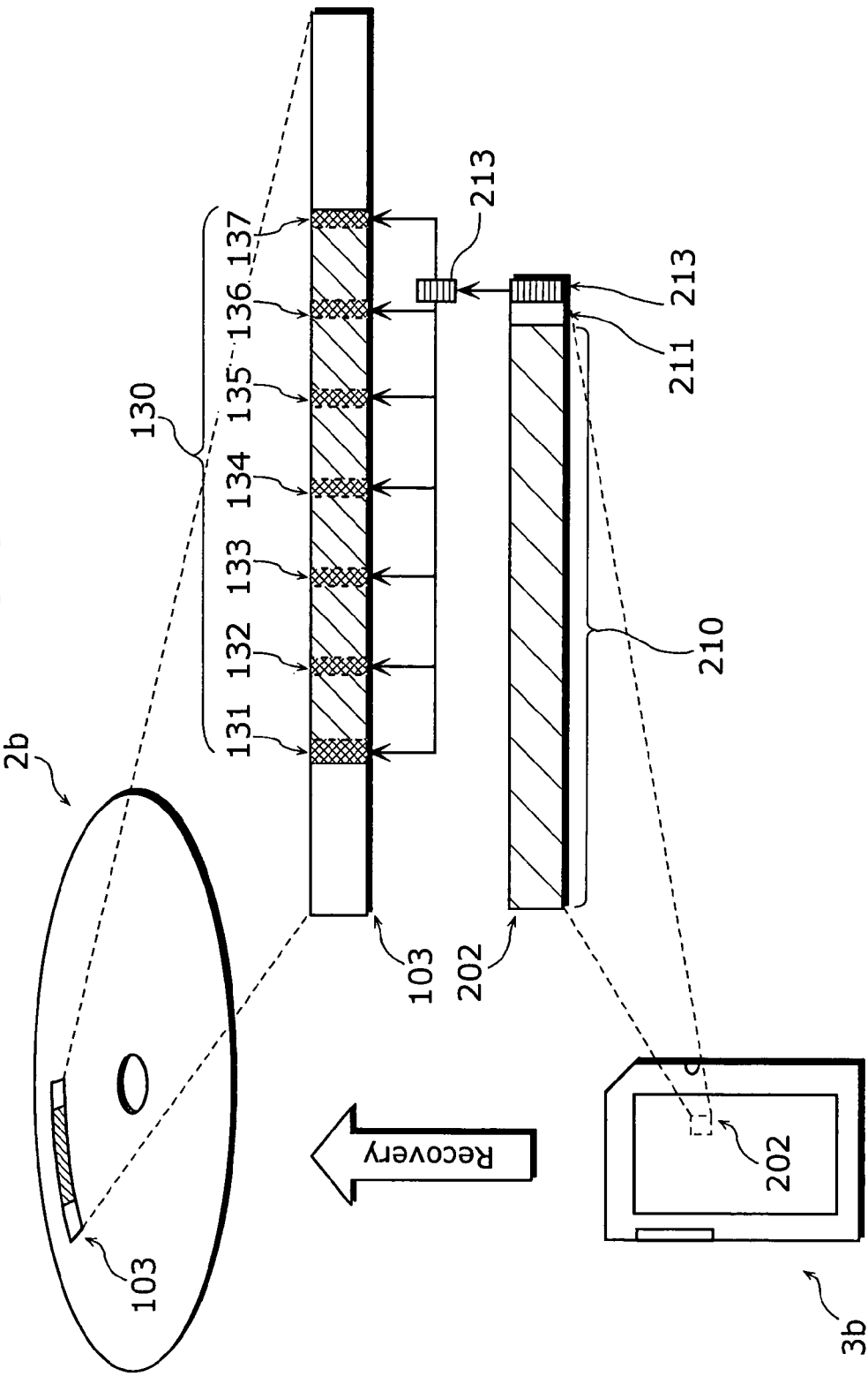
FIG. 14 is a second illustration showing the data structure of the contents that are respectively shown before and after move processing in the recording and reproducing apparatus in the second embodiment.

As shown in FIG. 13 and FIG. 14, the contents 103 is recorded in the first recording medium 2b after the move processing is executed, and the contents 202 is newly recorded in the second recording medium 3b.

At this time, the move processing unit 72b rewrites the important information for reproduction of the parts 111 to 117 of the contents 101 in order to disable reproduction by encrypting the important information for reproduction.

Here, the contents 103 become the contents 101 after the parts 111 to 117 of the contents 101 are rewritten in order to disable reproduction.

The contents 202 includes a part 210 that corresponds to the part 110 that is moved from the first recording medium 2b to the second recording medium 3b, a part 211 that corresponds to terminal information, and a part 213 that corresponds to the reconstruction information, these parts being placed in the above-listed order from the top of the contents.

FIG. 13 and FIG. 14 show that: before the recovery processing is executed the contents 103 are recorded in the first recording medium 2b; at the time of executing the recovery processing, a part 213 of the contents 202 are read from the second recording medium 3b; after the recovery processing is executed the contents 202 are deleted from the second recording medium 3b and, the contents 101 are recorded on the first recording medium 2b.

The recovery processing unit 75b reads the part 213 of the contents 202 from the second recording medium 3b and recovers the parts 131 to 137 that are rewritten in order to disable reproduction by using the reconstruction information included in the read parts 213, at the time of recovering the part 130 of the contents 103. At this time, the decryption is performed using a decryption information included in the read reconstruction information with reference to the reference table (refer to FIG. 7).

Here, the contents 101 become the contents 102 after the parts 121 to 127 of the contents 101 are recovered using the reconstruction information included in the part 213 read from the second recording medium 3b.

Next, the move processing and the recovery processing that are executed in the recording and reproducing apparatus in the second embodiment will be described below.

Figure 15:
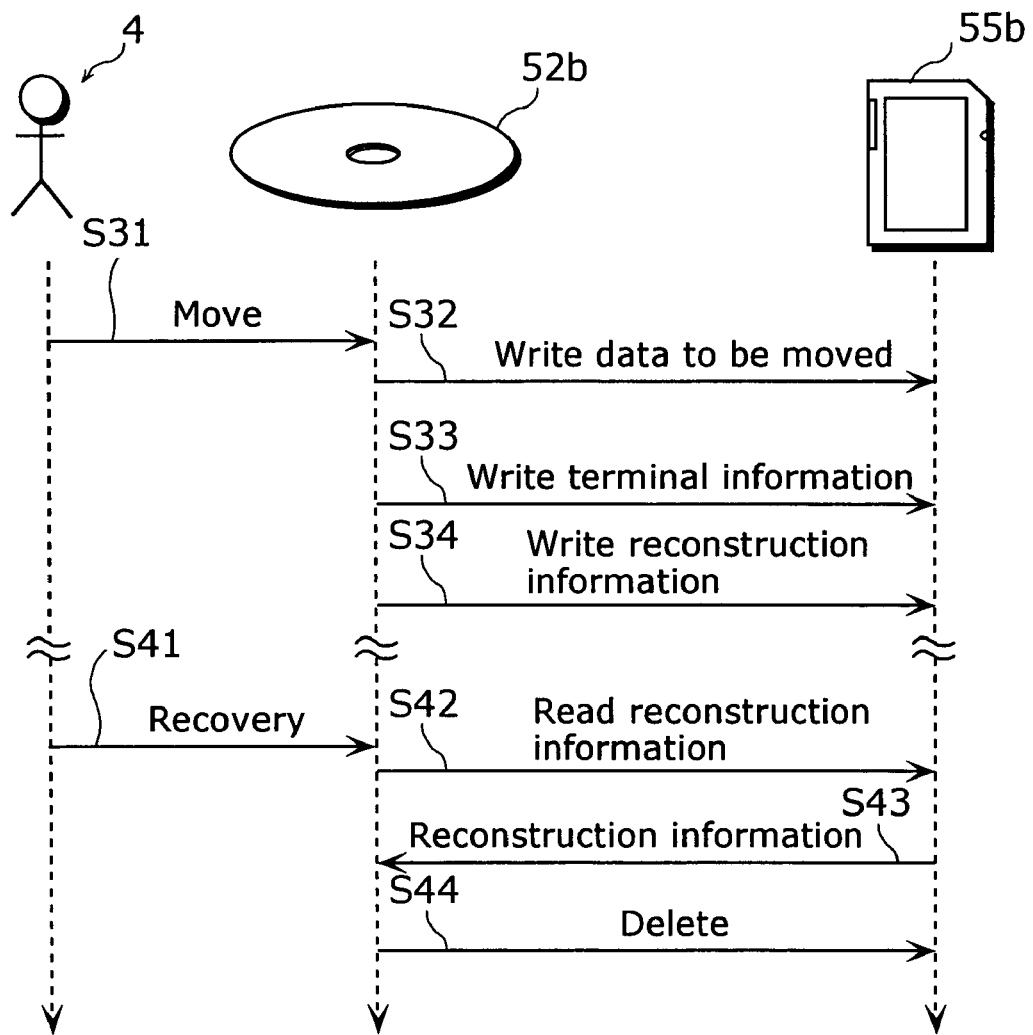
FIG. 15 is a diagram showing the sequence from move processing to recovery processing that are executed by the recording and reproducing apparatus in the second embodiment.

As shown in FIG. 15, the control unit 71a executes one of the following processing (a) and (b) in response to the request sent from a user 4.

The processing (a) is executed in the case of receiving a move request (sequence S31). The move processing unit 72b is controlled to execute this move processing as will be described below.

As shown in FIG. 15 and FIG. 16, the move processing unit 72b outputs a key generation request to the key generation unit 73b.

On the other hand, the key generation unit 73b generates an encryption key and a decryption key (step S201), sends the generated encryption key to the decryption unit 74b and sends the decryption key to the move processing unit 72b.

Also, the move processing unit 72a reads, from the first recording medium 2a, the data to be moved specified by the move request received by the control unit 71a (step S101) and outputs, to the second recording and reproducing unit 55a, the writing request to the read data to be moved (step S102).

On the other hand, the second recording and reproducing unit 55a receives the writing request outputted from the move processing unit 72b and writes, on the second recording medium 3b, the data to be moved received together with the writing request (sequence S32).

Also, the move processing unit 72b outputs the encryption request to the encryption unit 74b.

On the other hand, the encryption unit 74b encrypts the important information for reproduction in the data to be moved recorded in the first recording medium 2b using the encryption key sent from the key generation unit 73b.

After outputting the data to be moved to the second recording and reproducing unit 55a (step S105), the move processing unit 72b outputs the writing request of the terminal information to the second recording and reproducing unit 55a (step S106).

On the other hand, the second recording and reproducing unit 55a receives the writing request that is outputted from the move processing unit 72b and additionally writes, on the second recording medium 3b on which the data to be moved has already been written, the terminal information that has been received together with the writing request (sequence S33).

Also, the move processing unit 72b constitutes the reconstruction information using the encryption key sent from the key generation unit 73b and outputs the writing request of the constituted reconstruction information to the second recording and reproducing unit 55a (step S203).

On the other hand, the second recording and reproducing unit 55a receives the writing request outputted from the move processing unit 72b and additionally writes, on the second recording medium 3b on which the data to be moved has already been written, the reconstruction information that has been received together with the writing request (sequence S34).

At this point, the move processing unit 72b completes the move processing.

The processing (b) is executed in the case of receiving a recovery request (sequence S41). The recovery processing unit 75b is controlled to execute this recovery processing as will be described below.

As shown in FIG. 15 and FIG. 17, the recovery processing unit 75b outputs, to the second recording and reproducing unit 55a, the reading request corresponding to the reconstruction information that is recorded in the second recording medium 3b in association with the data to be recovered specified by the recovery request received by the control unit 71a (sequence S42).

On the other hand, the second recording and reproducing unit 55a receives the reading request outputted from the recovery processing unit 75b, reads the reconstruction information specified by the received reading request from the second recording medium 3b (step S211) and sends the read reconstruction information to the recovery processing unit 75b (sequence S43).

Further, the recovery processing unit 75b receives the reconstruction information sent from the second recording and reproducing unit 55a and recovers the encryption parts in the data to be recovered using the decryption key included in the received reconstruction information (step S212). Also, while recovering the data to be recovered, the recovery processing unit 75b outputs, to the second recording and reproducing unit 55a, a deletion request of the contents recorded in the second recording medium 3b in association with the data to be recovered (sequence S44).

On the other hand, the second recording and reproducing unit 55a receives the deletion request outputted from the recovery processing unit 75b and deletes, from the second recording medium 3b, the contents specified by the received deletion request (step S113).

At the time when the data to be recovered is recovered (step S213), and the contents recorded in the second recording medium 3b in association with the data to be recovered are deleted (step S115), the recovery processing unit 75b completes the recovery processing.

As described up to this point, the recording and reproducing apparatus in the second embodiment rewrites the important information for reproduction included in a part of or the whole contents to be moved in order to disable reproduction, at the time when the part of or the whole contents protected by copyright is moved from the first recording medium to the second recording medium. At this time, the reconstruction information is constituted using the decryption key used in decrypting the parts that have been rewritten, in encryption, in order to disable reproduction, and the constituted reconstruction information is recorded in the second recording medium in association with the contents in the copy-destination recording medium. Further, at the time of recovering the original contents based on the remaining contents that are recorded in the original recording medium, the recorded reconstruction information recorded, in association with the contents, in the copy-destination recording medium is read out instead of writing back the whole contents in the copy-destination, and the original contents is recovered by using the decryption key included in the read reconstruction information and decrypting the parts that have been rewritten in order to disable reproduction.

In this way, it is possible to recover the original contents securely protecting the copyright of the contents, in a short time and without increasing the processing workload. Further, the data size of the reconstruction information that is recorded in the second recording medium accompanied by the moving can be made smaller in the case of constituting the reconstruction information using the decryption key than in the case of constituting the reconstruction information based on the important information for reproduction.

Third Embodiment

Next, a third embodiment of the present invention will be described with reference to figures.

The recording and reproducing apparatus in the third embodiment of the present invention has a feature of converting the display resolution of a part of or the whole contents to be moved from high to low at the time of executing the move processing.

Taking this into consideration, the recording and reproducing apparatus in the third embodiment will be described. Note that the same components as the ones in the first embodiment are respectively given the same reference numbers and descriptions for such components will be omitted here.

First, a detailed functional structure of the recording and reproducing apparatus in this third embodiment will be described below.

Figure 18:
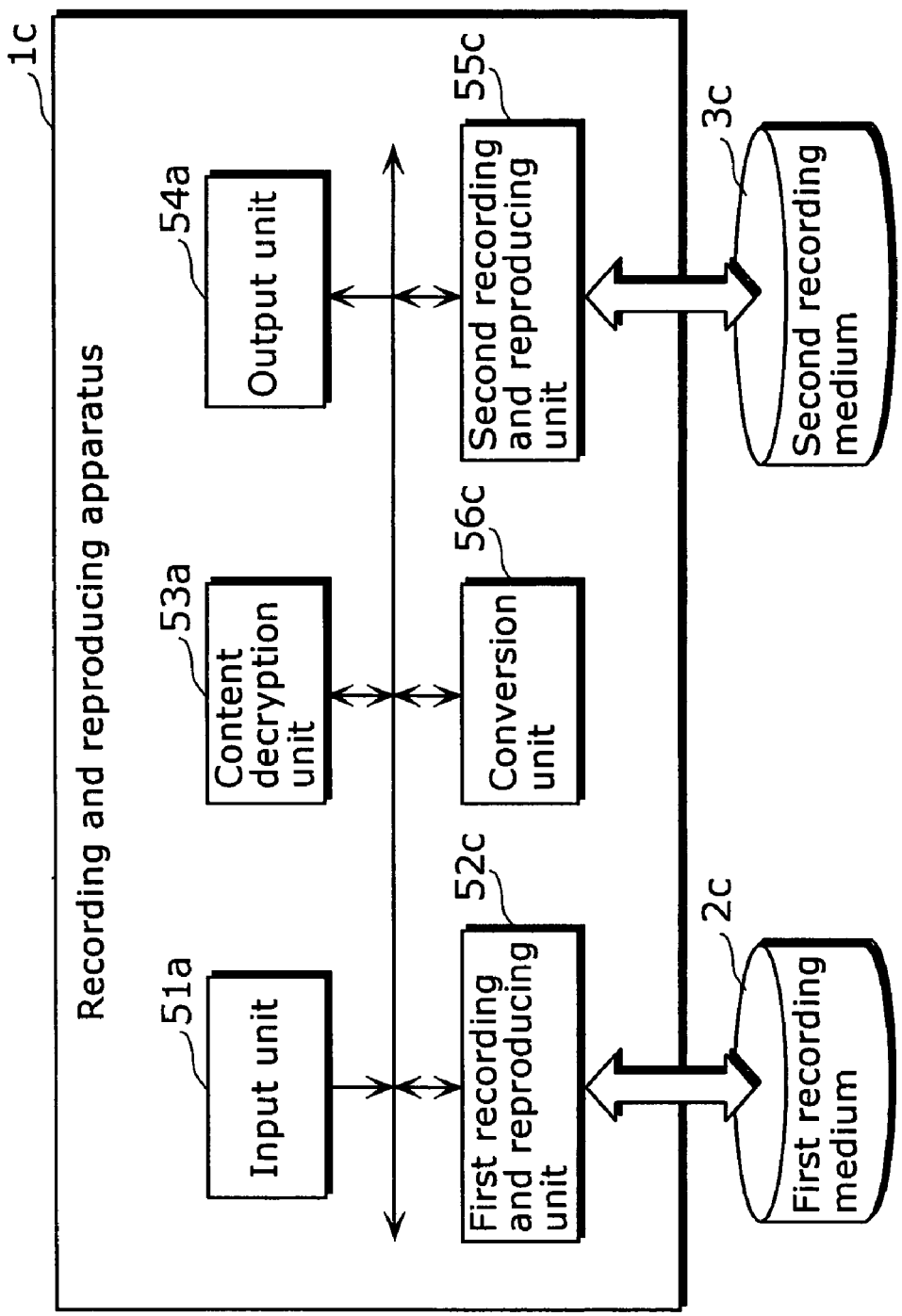
FIG. 18 is a diagram showing the functional structure of the recording and reproducing apparatus of a third embodiment of the present invention.

As shown in FIG. 18, the recording and reproducing apparatus 1c differs from the recording and reproducing apparatus 1a in the following points (a) and (b).

(a) having the first recording and reproducing unit 52a, and, instead of the second recording and reproducing apparatus 55a, the first recording and reproducing unit 52c and the second recording and reproducing unit 55c.

The first recording and reproducing unit 52c outputs the data to be moved read from the first recording medium 2c to the second recording and reproducing unit 55c via a conversion unit 56c, at the time of moving a part of or the whole contents protected by copyright, from the first recording medium 2c to the second recording medium 3c.

(b) further having a conversion unit 56c.

The conversion unit 56c converts the display resolution of the contents from high to low. Also, it converts the bit rate of the contents from high to low.

In the case where the first recording medium 2c is a BD-RE, and the second recording medium 3c is a DVD-RAM, conversion from the BD-RE to the DVD-RAM is performed in the following way: the display resolution of the MPEG2-TS format contents stored in the BD-RE is converted from the high-definition television (HDTV) to the standard definition television (SDTV); the contents are converted to the MPEG2-PS format contents by converting the data rate; and then the converted contents are recorded in the DVD-RAM. Conversion processing can be realized, for example, in the following way: completely decoding the MPEG2-TS format contents; thinning out samples of video signals; converting display resolution of the samples from HDTV to SDTV; coding the contents again using the MPEG2; and lastly multiplexing the contents in the MPEG2-PS format. As another way of conversion processing, a so-called Trans-Code may be used. Trans-Code is technique of converting the contents at the stage of DCT codes, which means the technique eliminates the necessity of decoding the whole contents.

Here, "HDTV" is high-definition television.

Also, "SDTV" is standard definition television.

As described up to this point, the recording and reproducing apparatus 1c in the third embodiment causes the internal conversion unit to convert the display resolution of video signals from HDTV to SDTV and decreases the data rate, at the time of moving the contents protected by copyright from the first recording medium 2c to the second recording medium 3c.

Figure 19A:
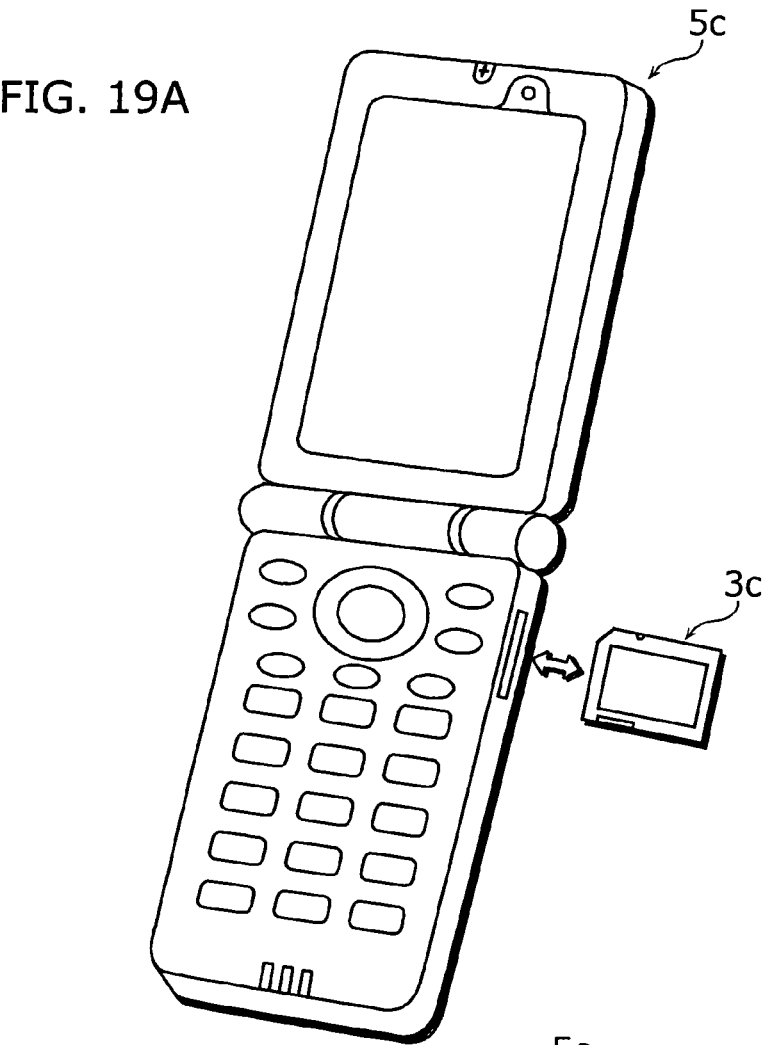
FIG. 19A is an illustration of a mobile phone and an SD card.
Figure 19B:
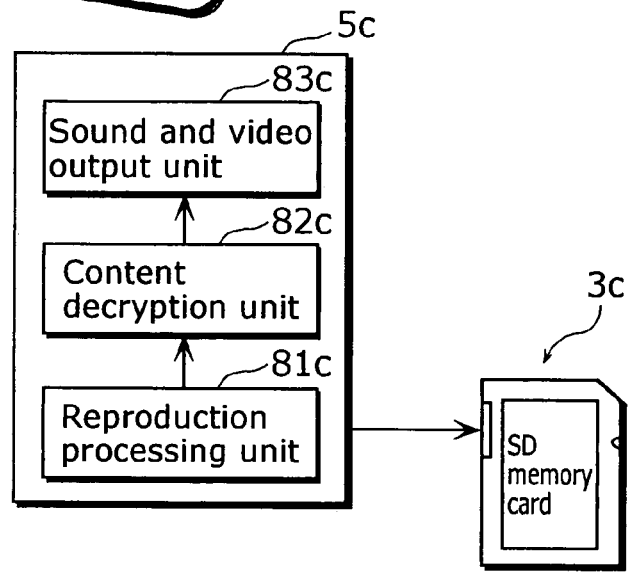
FIG. 19B is a diagram showing the outline structure of the reproduction apparatus in the third embodiment.

Employing this conversion processing makes it easier to perform reproduction. For example, a recording apparatus 5 shown in FIG. 19B (which is small and light, consumes low power and has a reproduction processing unit 81c, a content decrypting unit 82c, a sound and video output unit 83c and the like) is suffice to perform this kind of reproduction.

The reproduction processing unit 81c reads the contents recorded in the second recording medium 3c and outputs the read contents to the content decoding unit 83c.

The content decryption unit 82c decrypts the contents outputted from the reproduction processing unit 81c and outputs the decrypted sound and video signals to the sound and video output unit 83c.

The sound and video output unit 81c outputs, to a user, the sound and video signals outputted from the content decryption unit 82c via a mobile display device such as a liquid crystal display or a mobile headphone.

In the case where the recording and reproducing apparatus 1c has performed a compression coding on the contents, decreased the data rate, and then recorded the contents in the second recording medium, the recording and reproducing apparatus 1c (a) extracts important information for reproduction before rewriting the important information for reproduction in the contents recorded in the first recording medium in order to disable reproduction, (b) constitutes reconstruction information based on the extracted one or more pieces of important information for reproduction, and (c) records the constituted reconstruction information on the second recording medium in association with the contents in the copy-destination recording medium. Further, at the time of recovering the original contents based on the remaining contents recorded on the first recording medium, the recording and reproducing apparatus 1c (a) reads the reconstruction information recorded in association with the contents in the copy-destination recording medium, and (b) recovers the original contents using the one or more pieces of important information for reproduction included in the read reconstruction information by overwriting the parts to be rewritten in order to disable reproduction instead of writing back the whole contents in the copy-destination In this way, a reproduction apparatus (which is small, light and consumes low power) becomes suffice to reproduce the contents securely protecting the copyright of the contents and to recover the original contents in a short time and without increasing the processing load.

(Others)

Note that contents may be a stream of the MPEG2 transport stream format or the MPEG2 program stream format.

Also, note that the recording and reproducing apparatus may include the first recording and reproducing unit instead of the second recording and reproducing unit.

Figure 20:
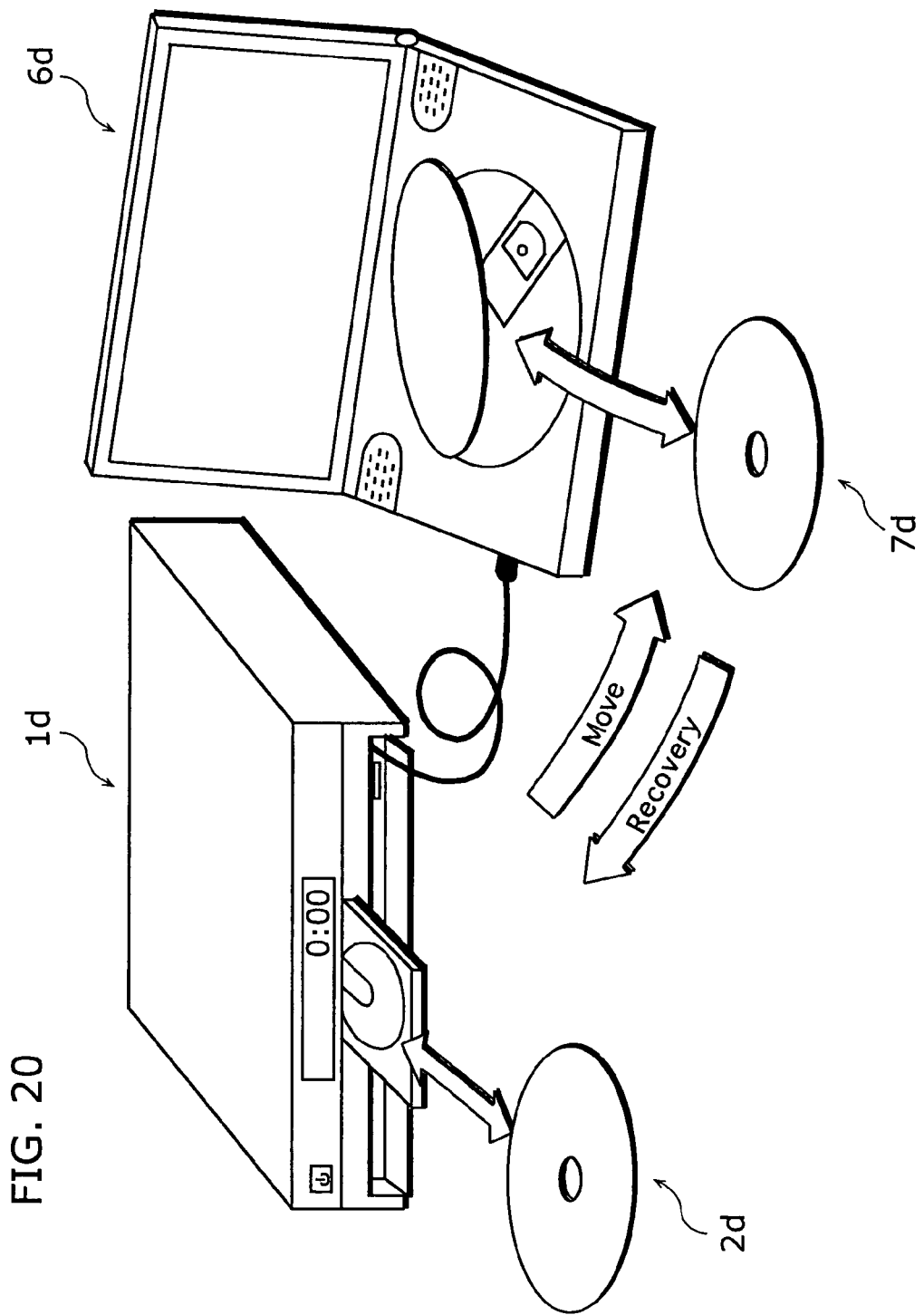
FIG. 20 is an illustration showing a stationary recording and reproducing apparatus and a portable recording and reproducing apparatus in a description part named Others of the present invention.

As shown in FIG. 20, for example, the stationary recording and reproducing apparatus 1*d* includes the first recording and reproducing unit, and the mobile recording and reproducing apparatus 6*d* includes the second recording and reproducing unit. At this time, the first recording and reproducing unit of the stationary recording and reproducing apparatus 1*d* outputs, to the second recording and reproducing unit of the mobile recording and reproducing apparatus 6*d*, the data to be moved that have been read from the first recording medium 2*d*, at the time of moving a part of or the whole contents protected by copyright from the first recording medium 2*d* to the third recording medium 7*d*.

Note that EP_map may be used instead of a reference table. Originally, EP_map is designed for a table set for performing a special reproduction in a BD-RE. However, the use of this makes it possible to reduce overhead that is needed for generating another reference table for recovery processing exclusively.

Figure 21:
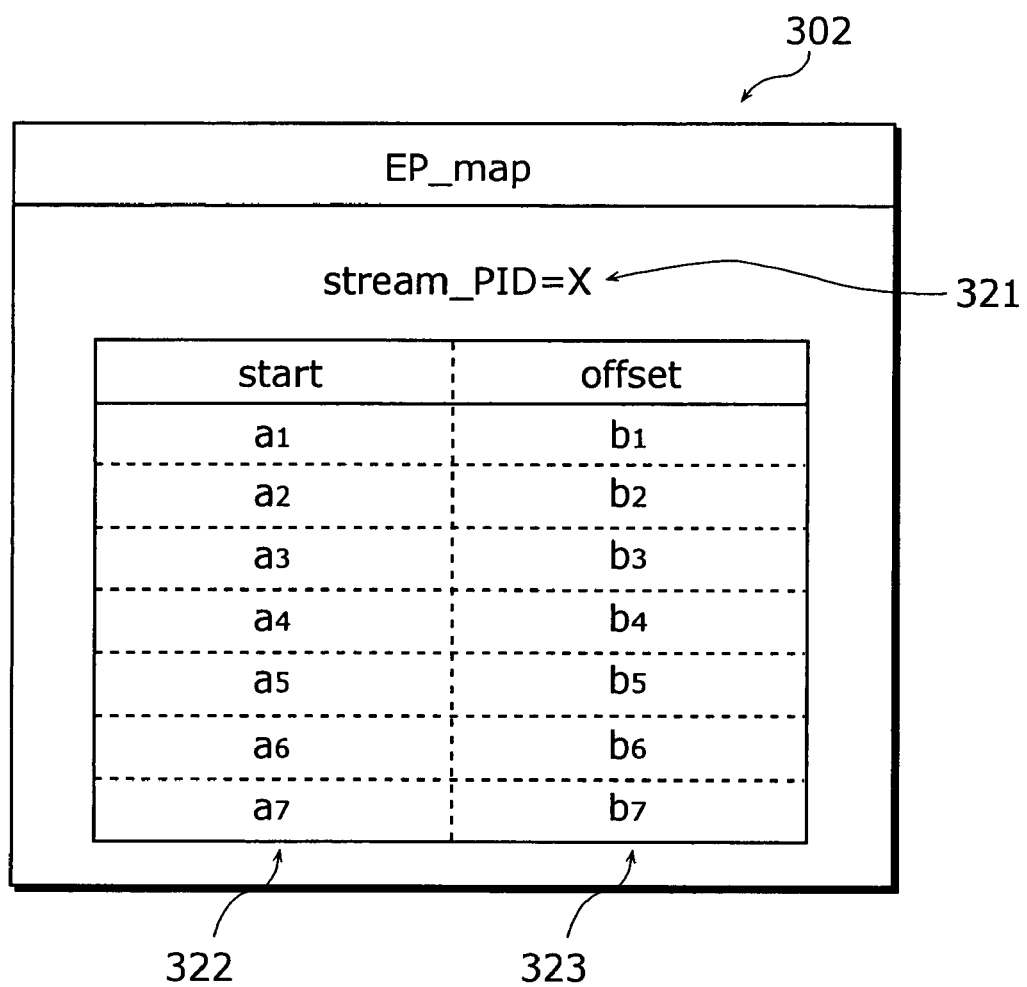
FIG. 21 is a diagram showing the data structure of EP_map that is referred to at the time of recovering the contents which have been rewritten in order to disable reproduction in the recording and reproducing apparatus in the Others.

As shown in FIG. 21, EP_map 302 is composed of an area 321 for storing the information on the contents on which the move processing is performed, a column 322 for storing the start addresses of the respective parts 121 to 127 (the parts that have been rewritten in order to disable reproduction), and a column 323 for storing the respective offsets.

Here is an example of the part 120 that has been rewritten in order to disable reproduction after the execution of the move processing. In the area 311 "stream_PID=X" that is the identification information of the contents 102 is shown. In the column 322 "start=a1" that is the start address of the part 121 is shown. Also, in the column 313 "offset=b1" of the part 121 is shown.

Note that EP_map 302 is generated at the time when the move processing is performed on the part 120, and EP_map 302 is recorded in the first recording medium.

Note that an MPEG2 packetized elementary stream (called PES hereafter) may be used as the important information for reproduction instead of an I picture or the header information.

As shown in FIG. 22, PES packets are variable length packets. The PES packet data corresponding to an elementary stream in which video and audio are compressed. As it is allowed to generate a paketized elementary stream that does not have an area for describing a PES packet length, it is impossible to know the position of the next PES packet based on such a PES packet length. Therefore, the top position of a PES packet is judged by detecting a PES start code.

For example, in the MPEG2, in the case where the top 24 bits in the data of continuous 32 bits are described as "00 00 01" of hexadecimal digits, a set of these 32 bits is determined as a start code. In this case, a set of remaining 8 bits indicates the type of the start code. This start code is used for indicating the header start position in the respective layers of the stream. It is prescribed in the MPEG 2 standard that 0s should not be continuously stored in 23 bits or more outside the area for describing a start code in a stream, in order to eliminate the occurrence of an error in detecting a start code. However, in the case where a part of the PES packets are overwritten using "00" at irregular intervals, start code emulation is performed in detecting a PES start code. In other words, that the packet data has been overwritten using "00" results in generating patterns of 24 bits represented as "00 00 01" that were not present in the original packet data. This may cause an error in detecting the top position of a PES packet, and it becomes impossible to decode normal images.

Note that a packet ID of an MPEG2 transport stream may be used as important information for reproduction instead of an I picture or the header information.

Figure 23:
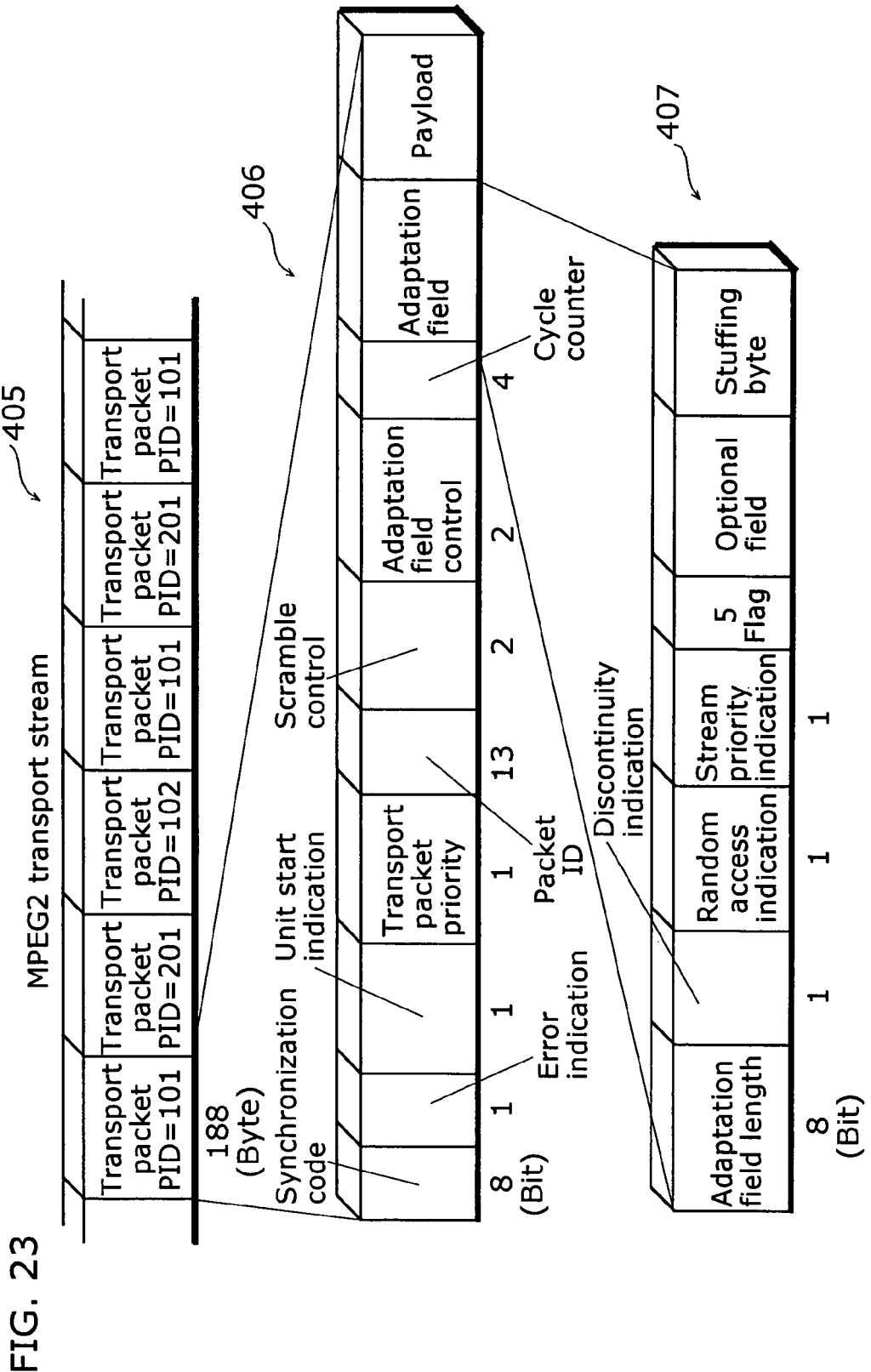
FIG. 23 is a diagram showing the data structure of the MPEG-2 transport stream in the Others.

As shown in FIG. 23, the transport stream is composed of transport stream packets that respectively have fixed lengths of 188 bytes. Also, a transport stream packet is composed of a synchronization code (8 bits), an error indication (1 bit), a unit start indication (1 bit), a transport packet priority (1 bit), a packet ID (13 bits), a scramble control (2 bits), an adaptation field control (2 bits), a cycle counter (4 bits), an adaptation field and a payload. Further, in the payload of a PES stream PES packets of a PES stream (refer to FIG. 22) are stored. After that, a stream is divided into transport packets having a same packet ID, and then multiplexed to a transport stream. Therefore, in normal digital broadcasting, plural streams are multiplexed to a transport stream as transport packets having a unique PID.

For example, in the case of a transport stream having the following PIDs: 101 for video 1; 201 for video 2; and 102 for sound 1, the data in the transport packets are multiplexed on time axis. Deleting PIDs of all the packets during a certain period makes it possible to conceal the information indicating the association between these PIDs and the respective PES streams included in the payload of a transport packet. For example, it is impossible to separate streams of video 1, video 2 and sound 1 from each other because they have already been mixed.

Note that a pack header in an MPEG2 program stream may be used as such important information instead of an I picture or header information.

Figure 24:
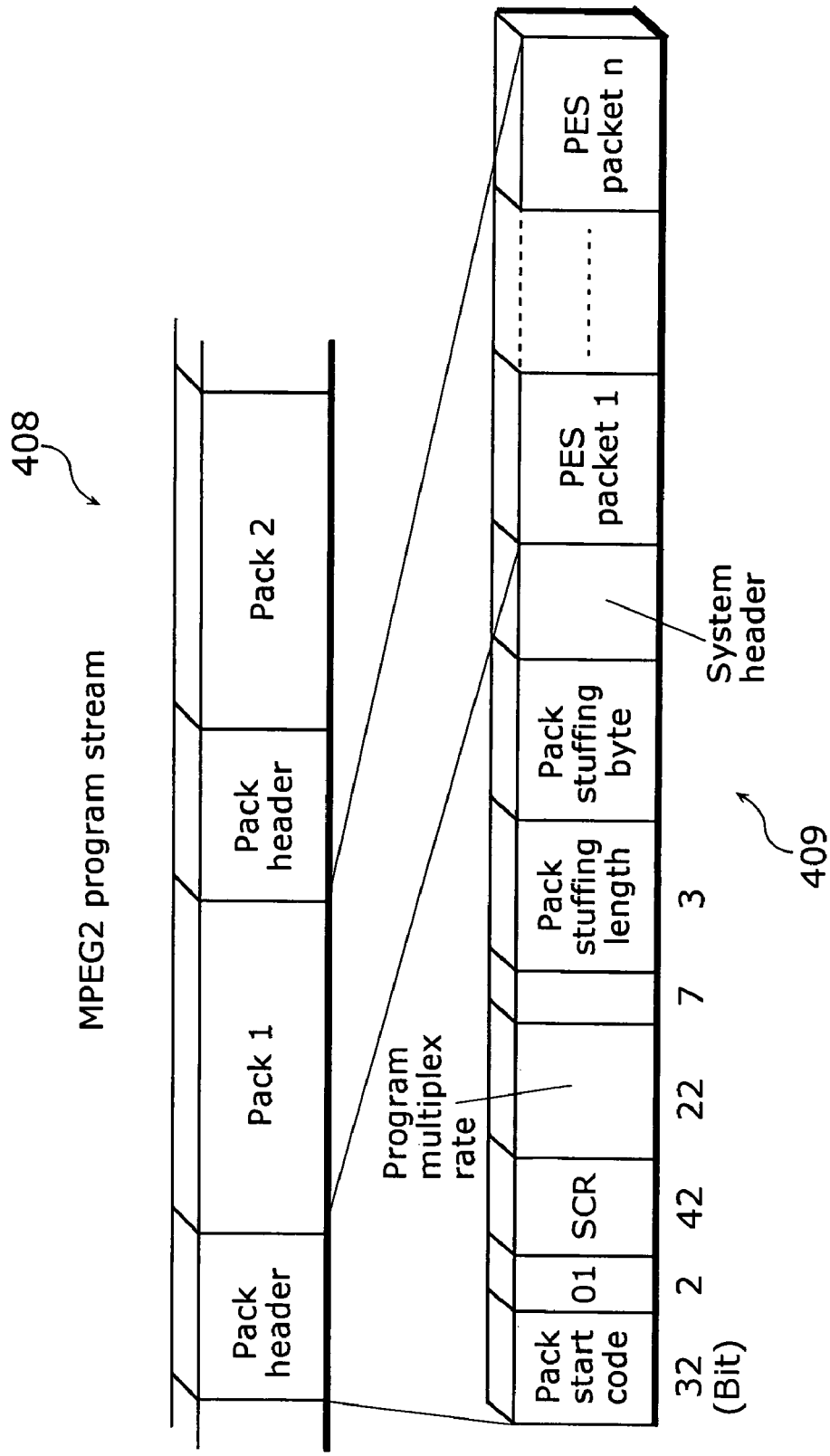
FIG. 24 is a diagram showing the data structure of the MPEG-2 program stream in the Others.

As shown in FIG. 24, the program stream is composed of packets called pack. The MPEG standard does not prescribe the number of bytes of each pack but prescribes that the number of bytes should be a fixed length of 2048 bytes in the case of application to DVDs. Also, one or plural PES packets are multiplexed in a pack. Note that whether each PES packet is video or sound is judged based on the corresponding stream ID that is multiplexed in the corresponding PES header. Also, information that associates a stream ID with the contents of a stream in the stream is multiplexed as an exclusive PES packet.

For example, deleting the PES headers of all the PES packets in a predetermined range makes it impossible to disable identifying the association between streams in a PES packet. Also, the information on data rate buffering and time base for reproducing PES packets are multiplexed in a pack header. Deleting pack headers in a predetermined range makes it difficult to reproduce streams smoothly. This is especially effective in a system for multiplexing a stream with a variable bit rate such as a DVD.

Note that the recording and reproducing apparatus control program may be recorded on a computer-readable recording medium so that it can be easily read by a hardware system such as a computer system and an installed system. Such recording media are: an optical recording medium such as a CD-ROM; a magnetic recording medium such as a hard disc; a magneto-optical recording medium such as an MO; and a semiconductor memory such as a memory card. Also, the recording and reproducing apparatus control program may be executed in another hardware system via a recording medium like listed above.

Also, the recording and reproducing apparatus control program may be held in a hardware system on a network, and executed in another hardware system that downloads, via a network, the recording and reproducing apparatus control program.

Note that the content protection unit may be realized in a recording and reproducing apparatus by a program stored in a ROM or may be installed in a system LSI.

Note that the system LSI may be realized by a fully-customized large scale integration (LSI) or by a semi-customized LSI such as an application specific integrated circuit (ASIC). Also, it may be realized by a programmable logic device such as a field programmable gate array (FPGA) and a complex programmable logic device (CPLD). Also, it may be realized by a dynamic reconfigurable device whose circuit structure is dynamically rewritable.

Further, the design data for forming one or more functions that constitute the content protection unit may be a program written in a hardware description language such as very high speed integrated circuit hardware description language (VHDL), Verilog-HDL, and SystemC (such program is called HDL program). Also, it may be a net list of a gate level obtained by logically synthesizing the HDL program. Also, it may be macro cell information that is generated by adding position information, process conditions and the like to the net list of a gate level. Also, it may be mask data in which sizes, timing and the like are prescribed.

Further, the design data may be recorded in a computer-readable recording medium so that it can be easily read by a hardware system such as a computer system and an installed system. Such recording media are: an optical recording medium such as a CD-ROM; a magnetic recording medium such as a hard disc; and a magneto-optical recording medium such as an MO; a semiconductor memory such as a RAM. Also, the design data may be downloaded by a programmable logic device via a download cable.

Also, the design data may be held in a hardware system on a transmission path such as a network so that it can be obtained in another hardware system via a transmission path. Further, the design data obtained by a second hardware system from a first hardware system via the transmission path may be downloaded in a programmable logic device via a download cable.

Also, the design data that has been synthesized logically, placed and wired may be recorded in a serial ROM so that it can be transmitted to the FPGA during the circuit is energized. After that, the design data recorded in the serial ROM may be directly downloaded in the FPGA.

Also, the design data that has been synthesized logically, placed and wired may be generated by a micro processor during the circuit is energized and downloaded in the FPGA.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The present invention can be used as a recording and reproducing apparatus having a function for protecting copyright, especially, a recording and reproducing apparatus that can recover the original contents even in the case where (a) the copyrighted contents (of digital broadcasting) is recorded on a first recording medium, (b) reconstruction information is generated, the reconstruction information and a part of or the whole contents are moved from the first recording medium to a second recording medium, and (c) the original contents are reconstructed on the first recording medium by recovering the reconstruction information from the second recording medium.

The invention claimed is:

1. A recording and reproducing apparatus comprising:
a first recording medium slot for receiving a first recording medium in which a first content is stored;
a second recording medium slot for receiving a second recording medium;
a receiving unit configured to receive a second content that is based on original data that is at least part of the first content;
a data modifying unit configured, when the received second content is recorded in a second recording medium, to delete at least part of the original data stored in said first recording medium or rewrite said at least part of the original data into other data, so as to disable reproduction of the original data;
an output unit configured to record reconstruction information in the second recording medium in association with the second content, the reconstruction information relating to the deleted or rewritten data; and
a recovery unit configured, when the reconstruction information is received from the second recording medium, to recover the original data recorded in said first recording medium according to the reconstruction information so as to enable the reproduction of the original data,
wherein:
the first content is a content coded according to a coding method in which inter frame referencing is performed, and
said data modifying unit is configured to (i) delete one of a reference image and header information of the reference image or (ii) rewrite said one of the reference image and the header information of the reference image into other data, the reference image being used when an image included in the original data is reproduced.

2. The recording and reproducing apparatus according to claim 1, wherein the reference image and the header information are included in the original data.

3. A recording and reproducing apparatus comprising:
a first recording medium slot for receiving a first recording medium in which a first content is stored;
a second recording medium slot for receiving a second recording medium;
a receiving unit configured to receive a second content that is based on original data that is at least part of the first content;
a data modifying unit configured, when the received second content is recorded in a second recording medium, to delete at least part of the original data stored in said first recording medium or rewrite said at least part of the original data into other data, so as to disable reproduction of the original data;
an output unit configured to record reconstruction information in the second recording medium in association with the second content, the reconstruction information relating to the deleted or rewritten data; and
a recovery unit configured, when the reconstruction information is received from the second recording medium, to recover the original data recorded in said first recording medium according to the reconstruction information so as to enable the reproduction of the original data,
wherein the reconstruction information includes address table information associating (i) the data deleted or rewritten into the other data by said data modifying unit and (ii) recording position information indicating a position of the deleted or rewritten data recorded in said first recording medium.

4. The recording and reproducing apparatus according to claim 3, wherein the address table information is generated based on table information specified in said first recording medium, for use in a reproduction mode different from a normal reproduction mode.

* * * * *